(12) United States Patent
Toyosawa et al.

(10) Patent No.: US 8,090,546 B2
(45) Date of Patent: Jan. 3, 2012

(54) ANALYSIS APPARATUS AND ANALYSIS METHOD

(75) Inventors: Eiji Toyosawa, Kawasaki (JP); Kenji Taki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/850,182

(22) Filed: Aug. 4, 2010

(65) Prior Publication Data
US 2010/0299082 A1    Nov. 25, 2010

Related U.S. Application Data

(63) Continuation of application No. PCT/JP2009/056893, filed on Apr. 2, 2009.

(30) Foreign Application Priority Data

Apr. 8, 2008    (JP) .................................. 2008-100677

(51) Int. Cl.
*G06F 19/00*    (2011.01)

(52) U.S. Cl. ................. 702/41; 702/42; 702/43; 702/44; 703/2; 703/6; 703/7; 700/214; 399/9; 399/16; 399/18; 399/21

(58) Field of Classification Search .............. 702/41–44; 703/2, 6, 7; 700/214; 399/9, 16, 18, 21
See application file for complete search history.

(56) References Cited

U.S. PATENT DOCUMENTS

| 6,950,787 B2 * | 9/2005 | Hashima et al. ............... 703/2 |
| 7,165,016 B2 * | 1/2007 | Toyosawa et al. .............. 703/6 |

FOREIGN PATENT DOCUMENTS

| JP | 11-116133 | 4/1999 |
| JP | 11-195052 | 7/1999 |
| JP | 2001-306633 | 11/2001 |
| JP | 2006-248769 | 9/2006 |
| JP | 2008-059198 | 3/2008 |

OTHER PUBLICATIONS

International Search Report issued Jun. 17, 2009 in PCT application No. PCT/JP2009/056893.

* cited by examiner

*Primary Examiner* — Sujoy Kundu
(74) *Attorney, Agent, or Firm* — Fitzpatrick, Cella, Harper & Scinto

(57) ABSTRACT

An elastic sheet is defined in accordance with a user input operation to have a shape with which the elastic sheet does not cross another member (building component) (step S1). Then, the elastic sheet is divided into rigid elements (step S2). Angles formed by each rigid element with adjacent rigid elements on two sides are calculated, and the calculation results and the like are stored in a RAM (step S3). A flexible medium which moves through a conveyance path is defined (step S4). Conveyance conditions when the flexible medium moves through the conveyance path are set (step S5). After that, the motion is calculated (step S6). The result of the motion calculation, that is, the behavior of the flexible medium, is displayed on a display device (step S7).

7 Claims, 23 Drawing Sheets

ANALYSIS APPARATUS AND ANALYSIS METHOD

This application is a continuation of PCT/JP2009/056893, filed Apr. 2, 2009.

TECHNICAL FIELD

The present invention relates to an analysis apparatus, analysis method, and the like suited to designing a flexible medium conveyance path.

BACKGROUND ART

Image forming apparatuses such as a copy machines and laser beam printers have a conveyance path through which a flexible, sheet-like medium such as paper is conveyed and moved. When designing the conveyance path, the behavior of a flexible medium which moves through the conveyance path is analyzed by a computer simulation, and rendered on a screen in order to shorten the development period and reduce cost.

Various simulation techniques have been proposed.

For example, there are known techniques of evaluating the conveyance resistance and abutment angle of a flexible medium with respect to a conveyance member (PLT1 and PLT2). More specifically, a flexible medium is expressed by finite elements according to a finite element method. Contact of the flexible medium with conveyance members such as a guide and roller in the conveyance path is determined, and the equation of motion is numerically solved.

There is also known a technique of more simply expressing a flexible medium using masses and springs to increase the calculation speed.

As for analysis of the motion of a flexible medium, Newmark $\beta$ method, Wilson $\theta$ method, Euler method, Kutta-Merson method, and the like are widely known. In these methods, the equation of motion of a flexible medium which is discretely expressed by finite elements or mass-spring systems is formulated. The analysis time is divided into time steps each having a finite span. An unknown acceleration, speed, and displacement are sequentially obtained from time 0 for each time step. In other words, numerical time integration is performed. In motion calculation of a flexible medium, the flexible medium is divided into rigid elements. A flexible medium model is created by coupling the rigid elements with springs. By using this model, calculation is done on the assumption that a force proportional to a displacement from an original shape is generated. That is, calculation is executed on the premise that the original shape is a shape rendered as an initial shape, and if it is deformed by an external force, a restoring force acts to restore the shape.

In general, the sectional shape of a flexible medium is linear when the flexible medium is set in an image forming apparatus such as a copy machine. Thus, the initial shape of a flexible medium is defined as a linear shape, and behavior calculation starts from a state in which the restoring force is 0. However, the calculation load and model scale increase if the entire conveyance path is simulated at once from paper feed to discharge for each model.

To prevent this, the following technique is proposed (PLT3). More specifically, only a part to be evaluated is extracted from the entire conveyance path. A flexible medium is arranged in conformity with the extracted conveyance path. The restoring force acts at the start of calculation, the initial shape of paper is calculated, and then a conveyance calculation is performed.

CITATION LIST

Patent Literature

PLT1: Japanese Patent Laid-Open No. 11-195052
PLT2: Japanese Patent Laid-Open No. 11-116133
PLT3: Japanese Patent Laid-Open No. 2006-248769

SUMMARY OF INVENTION

Technical Problem

However, the conventional simulation techniques suffer the following problems.

In some image forming apparatuses, a reversing device is arranged in the conveyance path to switch the flexible medium conveyance direction in order to enable double-sided printing. An elastic sheet is sometimes attached to convey a flexible medium in a reverse direction, branch the path, and convey the flexible medium in another conveyance path. The elastic sheet is, for example, a PET (polyethylene terephthalate) sheet. An elastic sheet is similarly used to press a conveyed flexible medium and orient it in a desired direction. The elastic sheet has been examined under various attachment conditions with various lengths and materials. However, the conventional flexible medium conveyance simulation techniques in which an elastic sheet is handled as a rigid body cannot obtain a result with satisfactory precision. Complicated condition setting may be able to increase the precision, but puts a heavy burden on the designer.

It is an object of the present invention to provide an analysis apparatus, analysis method, and the like capable of obtaining a high-precision simulation result by simple setting.

Solution to Problem

The present inventor has performed extensive study to solve the above problems, and has discovered the following aspects of the invention.

An analysis apparatus according to the present invention is characterized by comprising specifying means for specifying a deformable portion and indeformable portion of an elastic sheet in a conveyance path through which a flexible medium moves, rotational movement means for, when the deformable portion crosses another member in the conveyance path, rotating and moving the deformable portion by using a boundary between the deformable portion and the indeformable portion as a fulcrum until the deformable portion moves apart from the member, setting means for setting a rigidity of the elastic sheet, definition means for defining the elastic sheet as an elastic member, and calculation means for calculating a behavior of the flexible medium when the flexible medium moves through the conveyance path, in consideration of a restoring force of the elastic member to restore a linear shape.

An analysis method according to the present invention is characterized by comprising a specifying step of specifying a deformable portion and indeformable portion of an elastic sheet in a conveyance path through which a flexible medium moves, a rotational movement step of, when the deformable portion crosses another member in the conveyance path, rotating and moving the deformable portion by using a boundary between the deformable portion and the indeformable portion as a fulcrum until the deformable portion moves apart from the member, a setting step of setting a rigidity of the elastic sheet, a definition step of defining the elastic sheet as an elastic member, and a calculation step of calculating a behavior of the flexible medium when the flexible medium moves through the conveyance path, in consideration of a restoring force of the elastic member to restore a linear shape.

Advantageous Effects of Invention

According to the present invention, when a deformable portion of an elastic sheet crosses another member, the crossing is canceled by rotating and moving the deformable portion. Then, the elastic sheet is defined as an elastic member and its behavior is calculated. A high-precision simulation result can be obtained by simple setting.

Further features of the present invention will become apparent from the following description of exemplary embodiments with reference to the attached drawings. Note that the same reference numerals denote the same or similar parts throughout the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Figure 1:
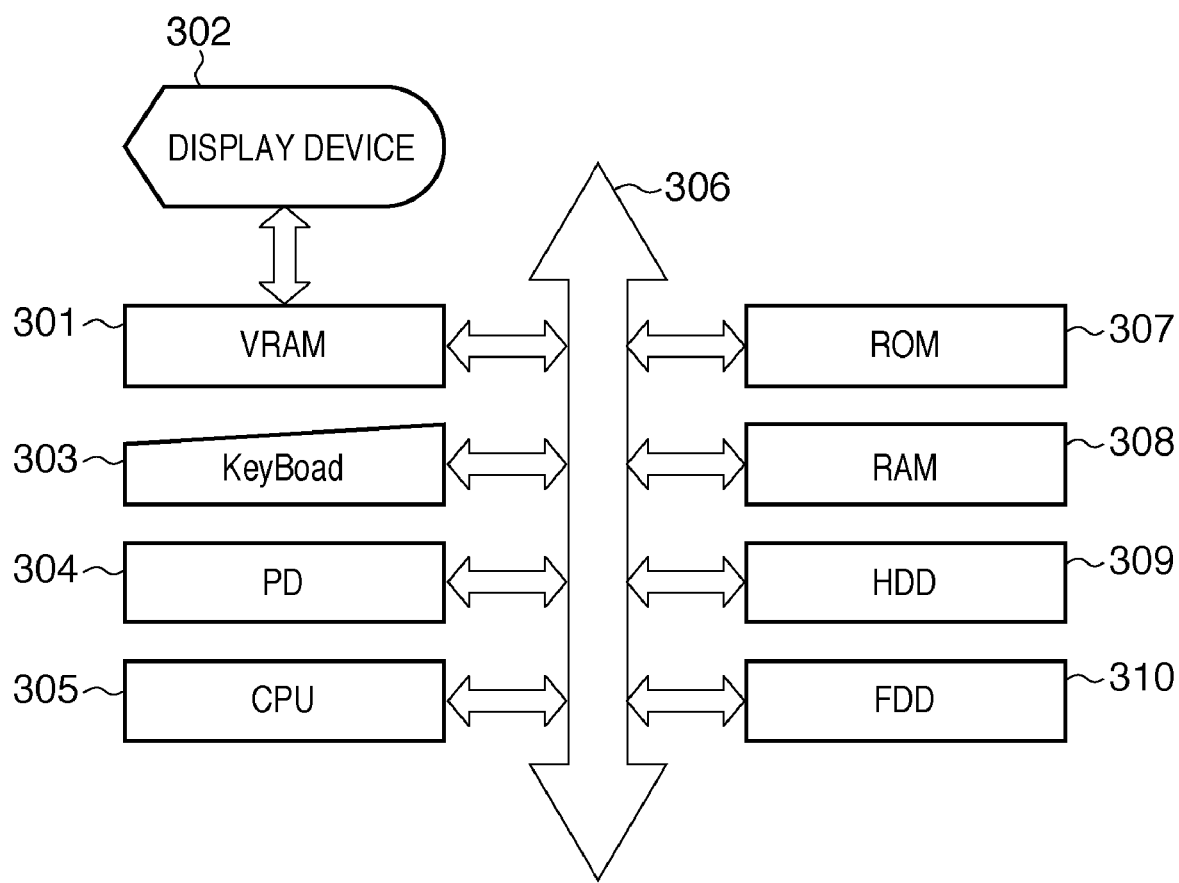
FIG. 1 is a block diagram showing the arrangement of a design support apparatus (analysis (simulation) apparatus) according to an embodiment of the present invention.

An embodiment of the present invention will be described in detail below with reference to the accompanying drawings. FIG. 1 is a block diagram showing the arrangement of a design support apparatus (analysis (simulation) apparatus) according to the embodiment of the present invention.

In the design support apparatus, devices such as a video RAM (VRAM) 301, keyboard 303, pointing device (PD) 304, CPU 305, ROM 307, RAM 308, hard disk drive (HDD) 309, and flexible disk drive (FDD) 310 are connected via an I/O bus (formed from an address bus, data bus, and control bus) 306.

The CPU 305 controls each device of the design support apparatus based on a control program (e.g., a design support program for supporting the design of a conveyance path) stored in the ROM 307. The RAM 308 is used as a work area when the CPU 305 executes the design support program or the like, a temporary save area in error processing, and the like. The HDD 309 and FDD 310 are used to save a database, application program, and the like for supporting the design of a conveyance path.

The video RAM 301 is a memory in which a text and image to be displayed on the screen of a display device 302 are rasterized and stored. The keyboard 303 has various kinds of input keys. The pointing device 304 is, for example, a mouse to move an icon or the like on the screen.

When the design support apparatus having this arrangement is turned on, the CPU 305 initializes it in accordance with a boot program in the ROM 307, and loads an OS (Operating System) from the HDD 309. After that, the CPU 305 executes processing based on the design support program and the like.

Note that the design support program may be stored not in the ROM 307 but in the HDD 309 or the like. The storage medium which stores the design support program is not limited to any particular storage medium.

Figure 2:
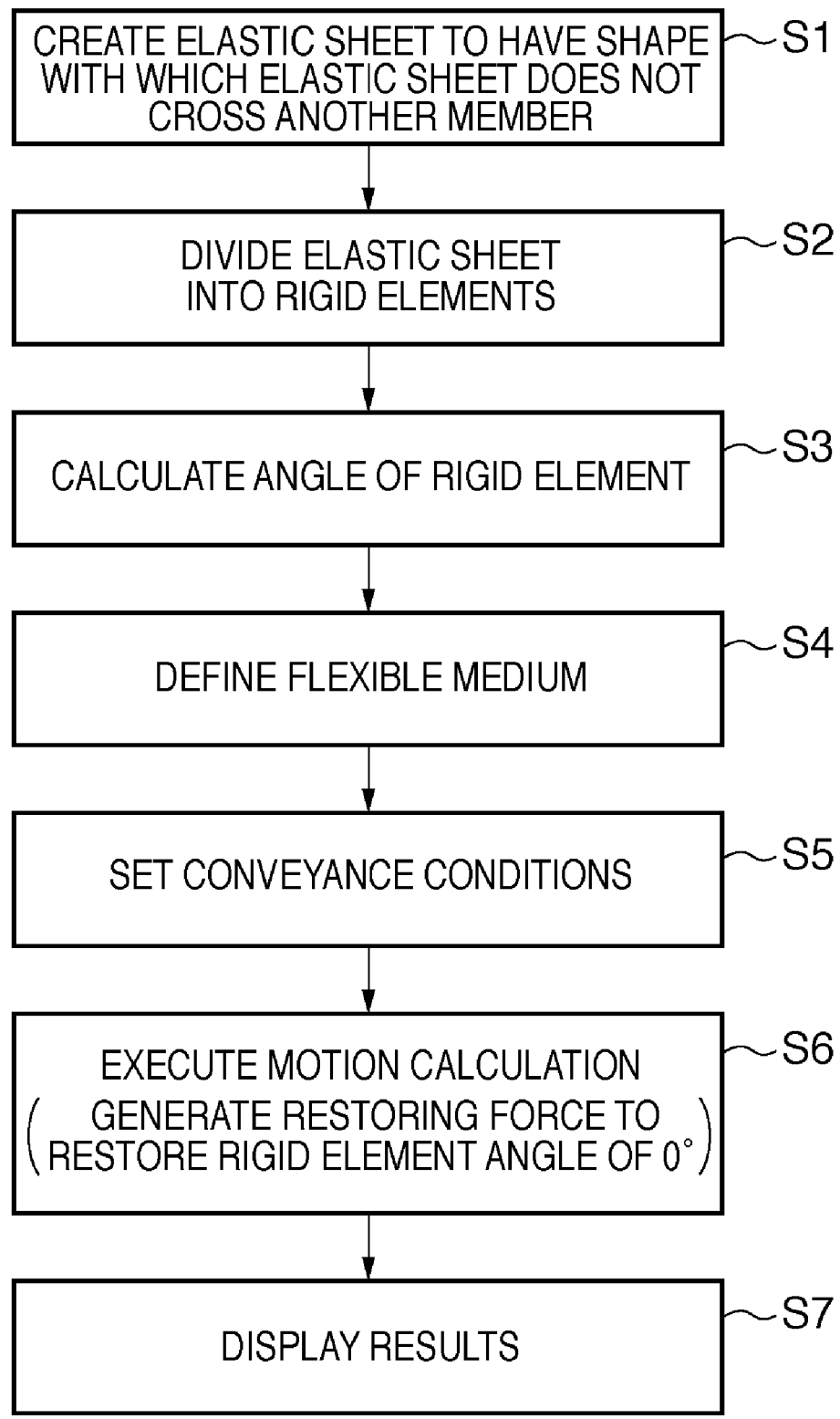
FIG. 2 is a flowchart showing the contents of a behavior simulation executed by a CPU 305 based on a design support program.

An outline of the contents of the design support program will be explained. The design support program causes the CPU 305 to simulate the behavior of a sheet-like flexible medium such as paper or a film when it is conveyed and moved through a conveyance path in which conveyance members such as a conveyance guide and conveyance roller are arranged. FIG. 2 is a flowchart showing the contents of a behavior simulation executed by the CPU 305 based on the design support program. As described above, the design support program is stored in, for example, the ROM 307, and executed by the CPU 305 using the RAM 308.

First, the CPU 305 defines an elastic sheet in accordance with a user input operation to have a shape with which the elastic sheet does not cross another member (building component) (step S1). Then, the CPU 305 divides the elastic sheet into rigid elements (step S2). The CPU 305 calculates angles formed by each rigid element with adjacent rigid elements on two sides, and stores the calculation results and the like in the RAM 308 (step S3). The CPU 305 defines a flexible medium which moves through the conveyance path (step S4). The CPU 305 sets conveyance conditions when the flexible medium moves through the conveyance path (step S5). After that, the CPU 305 calculates the motion (step S6). The CPU 305 displays the result of the motion calculation, that is, the behavior of the flexible medium on the display device 302 (step S7).

Figure 3:
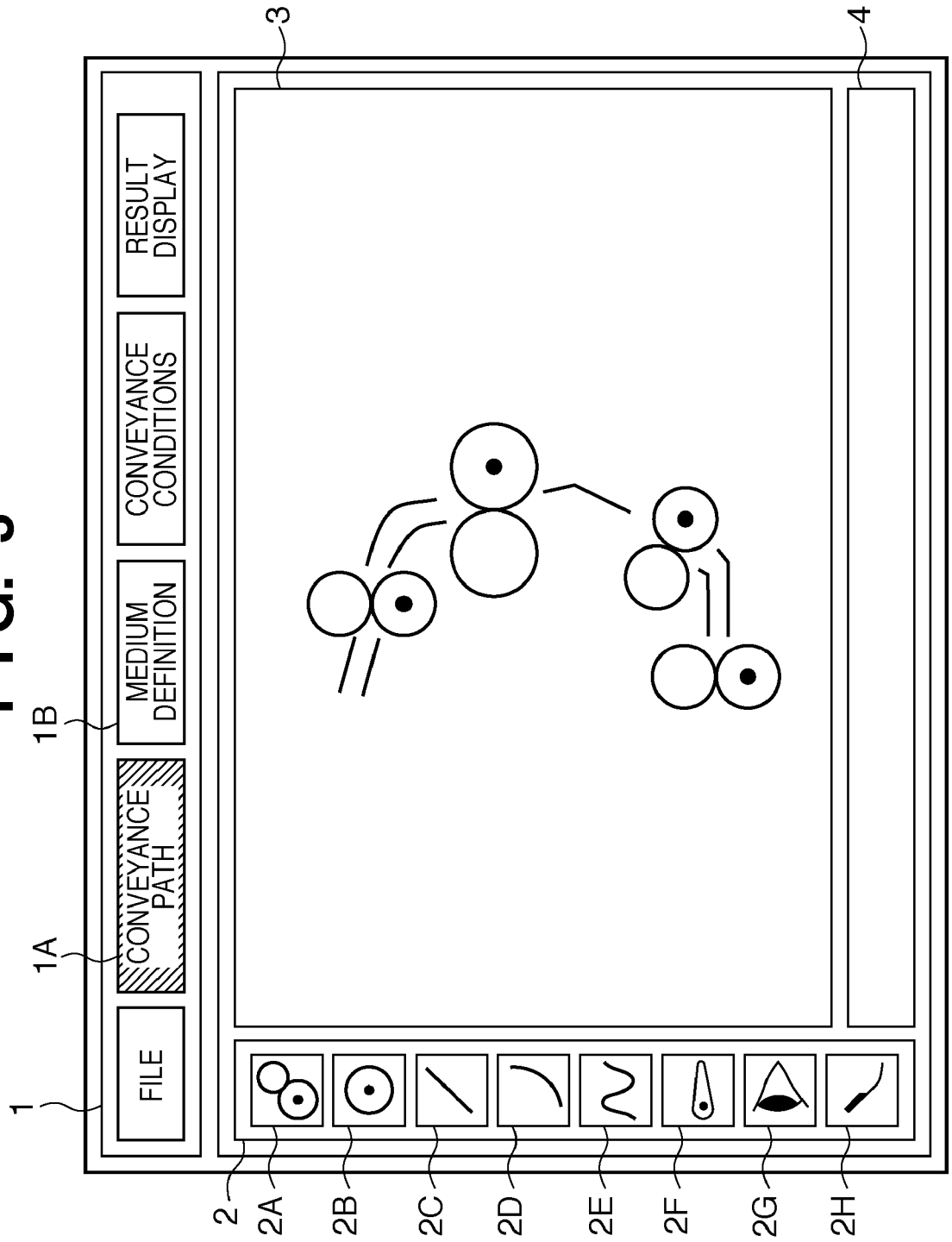
FIG. 3 is a view exemplifying a window displayed when defining a conveyance path.

Details of steps S1 to S7 will be described. Since these processes require input from the user, the CPU 305 displays predetermined windows on the display device 302, as needed. FIGS. 3 to 12, 14 to 17, 22, and 23 are views exemplifying windows displayed based on the design support program. As shown in FIG. 3 and the like, the window displayed based on the design support program includes a menu bar 1 for switching main processing, a submenu 2 for each procedure, a graphic window 3 for displaying a defined conveyance path and result, and a command field 4 for outputting a program message, and if necessary, inputting numerical values. The menu bar 1 includes, for example, "file", "conveyance path", "medium definition", "conveyance conditions", "result display" buttons. The submenu 2 is displayed in a desired range on the left side of the window.

Processing (step S1) regarding definition of an elastic sheet will be described next. In the processing regarding definition of an elastic sheet, a conveyance path is defined, and an elastic sheet is arranged.

<Definition of Conveyance Path>

FIG. 3 is a view exemplifying a window displayed when defining a conveyance path. When the user presses a "conveyance path" button 1A in the menu bar 1, the CPU 305 displays a conveyance path definition submenu 2 on the display device 302, as shown in FIG. 3. The conveyance path definition submenu 2 includes a roller pair definition button 2A for defining a pair of conveyance rollers using two rollers, a roller definition button 2B for singly defining one roller, and a linear guide definition button 2C for defining a linear conveyance guide. Also, the submenu 2 includes an arcuate guide definition button 2D for defining an arcuate conveyance guide, a spline guide definition button 2E for defining a conveyance guide with a spline curve, and a flapper definition button 2F for defining a flapper (point) which branches a path through a flexible medium is conveyed. Further, the submenu 2 includes a sensor definition button 2G for defining a sensor which detects whether a flexible medium is located at a predetermined position in the conveyance path, and an elastic sheet definition button 2H for defining an elastic sheet.

The buttons 2A to 2G correspond to components which form the conveyance path of an actual image forming apparatus such as a copy machine or printer. All components necessary to form the conveyance path of a flexible medium such as paper are desirably prepared. By manipulating these buttons, corresponding components can be arranged in the graphic window 3. That is, when each building component is defined from the submenu, its position and shape are reflected in the graphic window 3.

Figure 4:
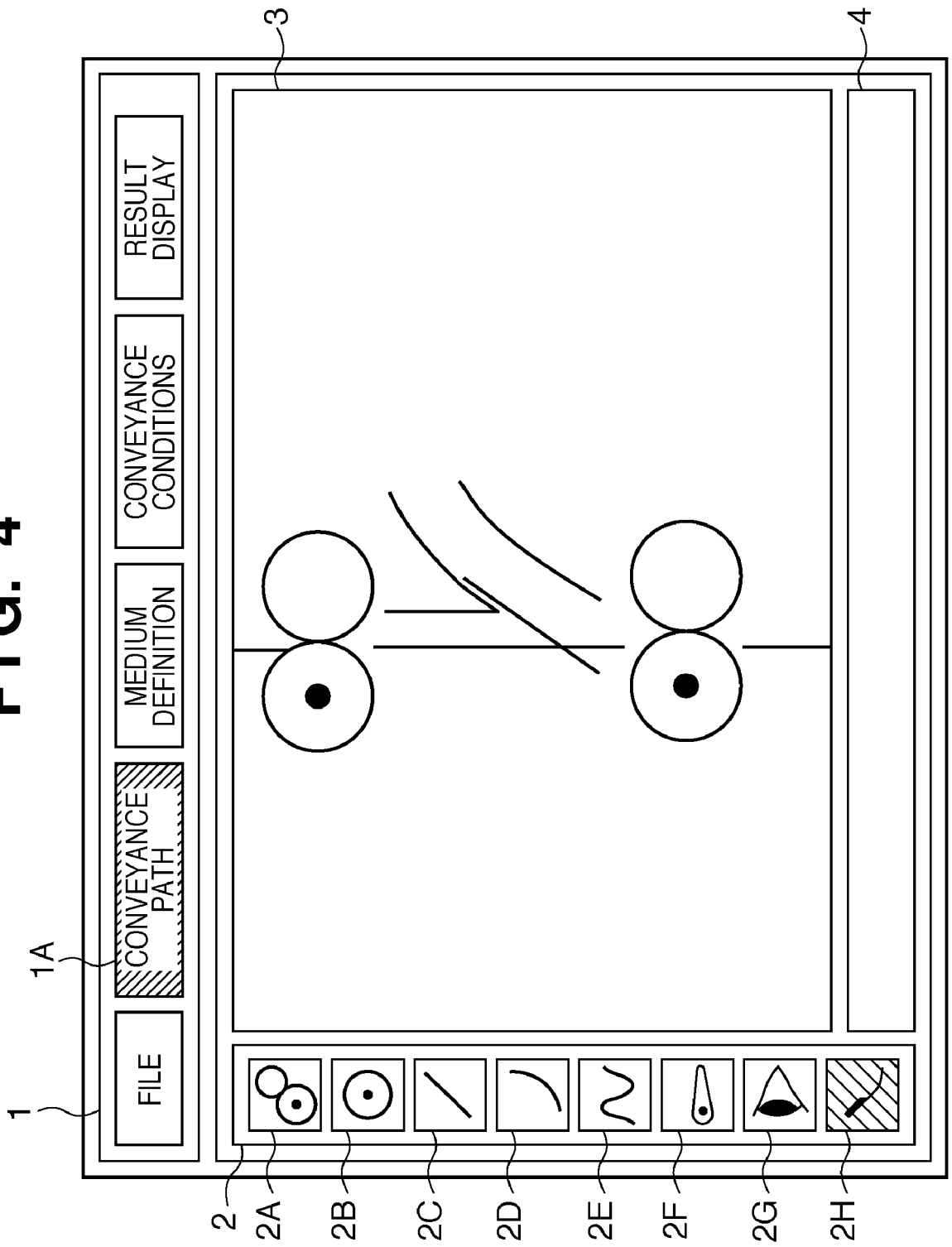
FIG. 4 is a view exemplifying a window displayed when a sectional shape output from a CAD system, analysis pre-and-post processor, or the like is loaded.

When a sectional shape output from a CAD system, analysis pre-and-post processor, or the like is loaded, the CPU 305 displays the sectional shape in the graphic window 3, as shown in FIG. 4. When defining respective building components using the sectional shape, the user selects the buttons 2A to 2G, then selects circles, line segments, arcs, and the like displayed in the window, and if necessary, inputs values necessary to set the respective building components.

<Arrangement of Elastic Sheet>

FIGS. 5 to 10 are views exemplifying windows displayed when arranging an elastic sheet. In the arrangement of an elastic sheet, a portion (indeformable portion) of a member handled as the elastic sheet, deformation of which is constrained by another building member, is specified, and a deformed portion (deformable portion) is specified. When the user presses the elastic sheet definition button 2H in the conveyance path definition submenu 2, the CPU 305 displays an elastic sheet definition submenu on the display device 302, as shown in FIGS. 5 to 10. The elastic sheet definition submenu 2 includes, for elastic sheet settings, a member designation button 4A, attachment guide designation button 4B, attachment coordinate point/length designation button 4C, and attachment coordinate point/distal end coordinate point designation button 4D. Regardless of a pressed button, the CPU 305 specifies a portion of a member handled as the elastic sheet, deformation of which is constrained by another building member, and specifies a deformed portion. Further, the CPU 305 specifies the length of the deformed portion. Processes when the user presses these buttons will be individually explained.

Figure 5:
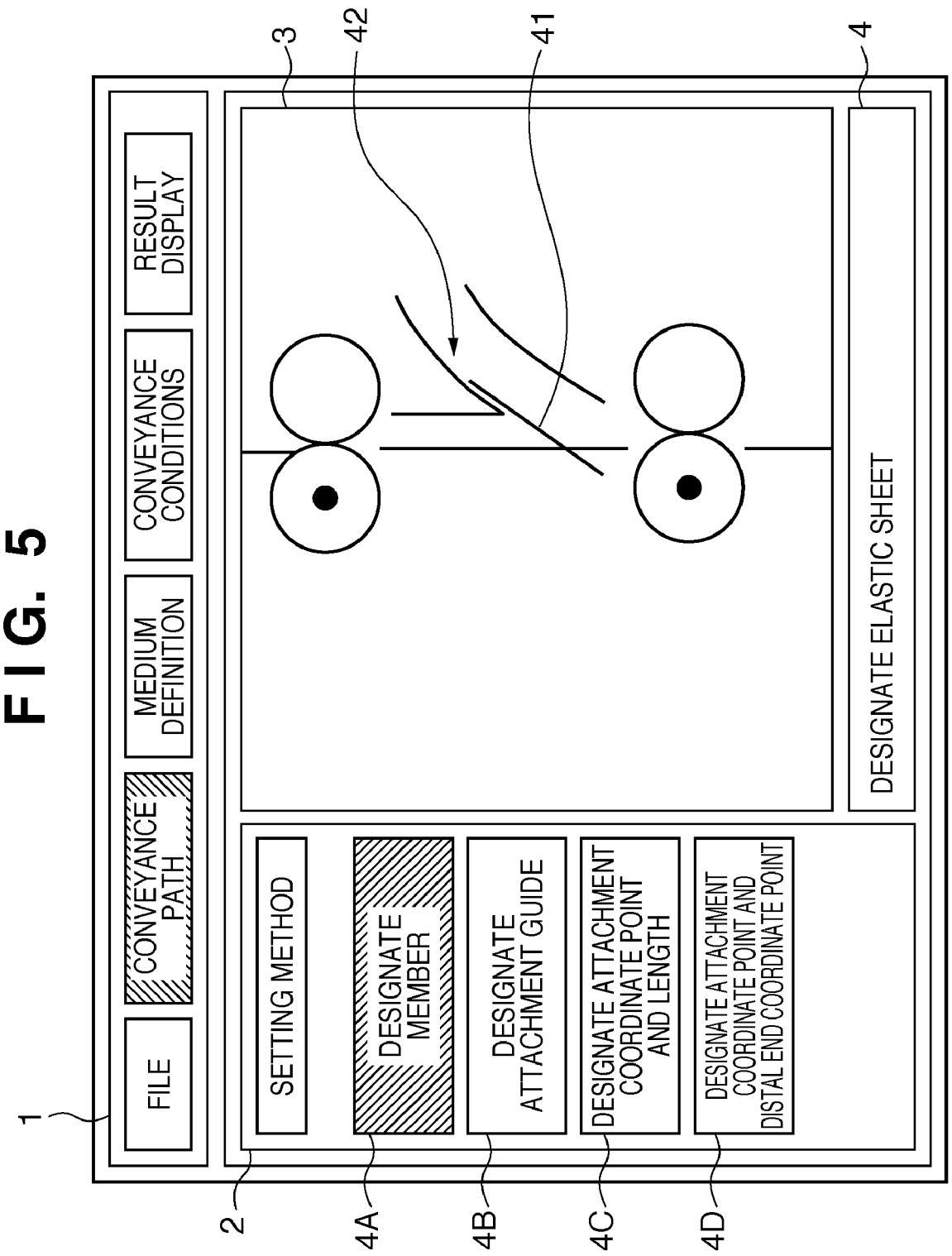
FIG. 5 is a view exemplifying a window displayed when a member designation button 4A is pressed.

When the user presses the member designation button 4A, the CPU 305 displays a message in the command field 4 to prompt him to select a member to be handled as an elastic sheet among members in the graphic window 3, as shown in FIG. 5. When the user selects a member 41 from the graphic window 3 using the pointing device 304, the CPU 305 regards the designated member 41 as an elastic sheet, and specifies, as the indeformable portion of the elastic sheet, an area 42 where the member 41 contacts another conveyance member with a certain length. Further, the CPU 305 stores the coordinate points of the two ends of the area 42 as those of attachment positions in the RAM 308. At this time, a building member in contact with the member 41 in the area 42 is a member which is fixed by attaching the elastic sheet. The CPU 305 specifies, as a deformed portion (deformable portion), a portion of the selected member 41 other than that in the area 42, and stores its length as the length of the deformed portion in the RAM 308.

Figure 6:
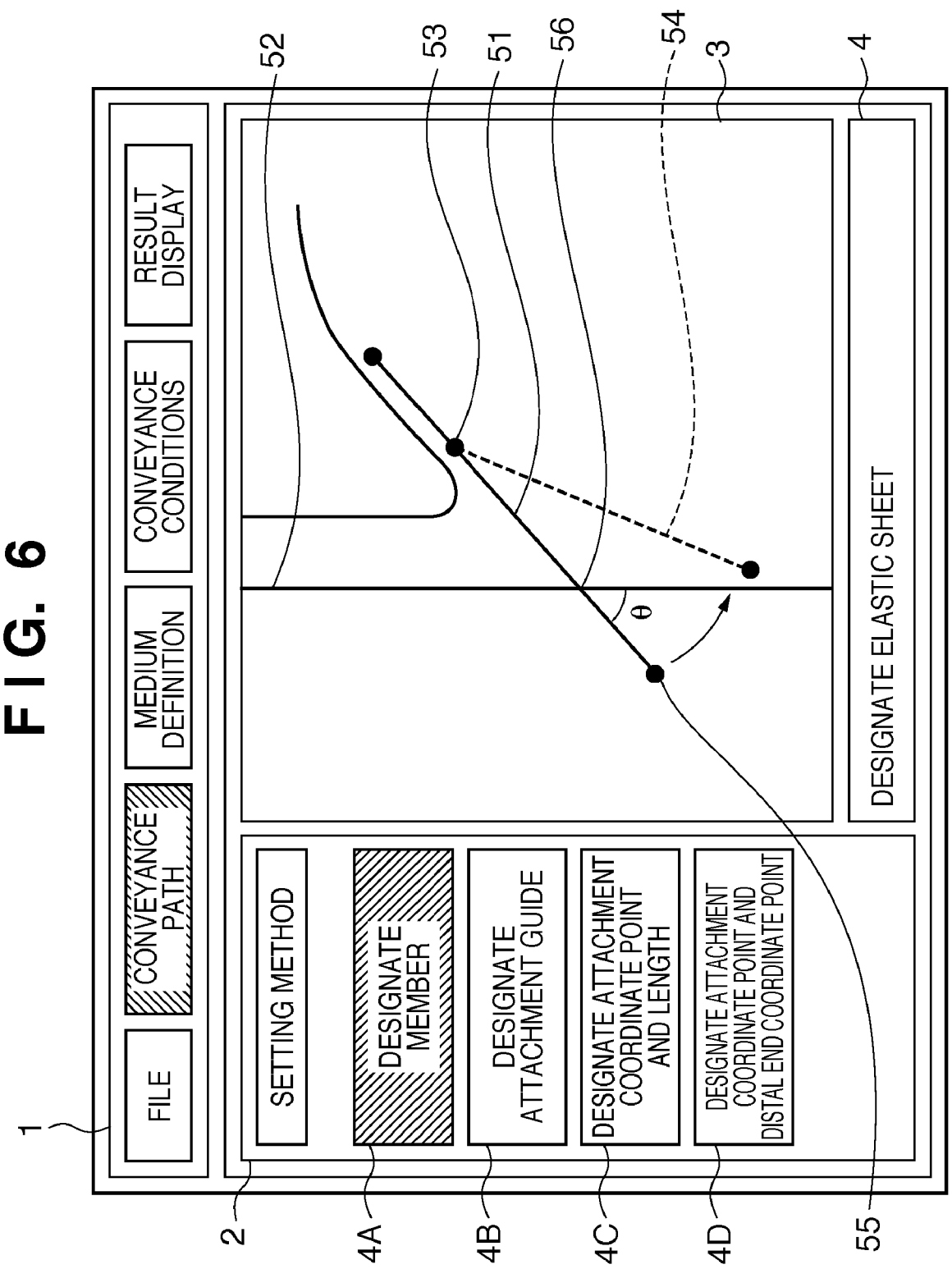
FIG. 6 is a view showing processing when line segments 51 and 52 cross each other.

Thereafter, the CPU 305 determines whether a line segment 51 which forms the deformed portion and a line segment 52 which forms another building member cross each other. If the line segments 51 and 52 cross each other, the CPU 305 rotates and moves the line segment 51 using, as a fulcrum, an end 53 on the side of the line segment 51 among the two attachment positions until crossing of the line segments 51 and 52 is canceled, as shown in FIG. 6. That is, the CPU 305 rotates and moves the line segment 51 using the boundary between the area 42 (indeformable portion) and the deformable portion as a fulcrum until the line segment 51 moves apart from the line segment 52. In the rotational movement, the CPU 305 controls the rotational direction of the line segment 51 so as to decrease the angle θ formed by a line segment which connects a distal end 55 of the deformed portion and an intersection point 56, and the line segment 52 (in a direction in which the angle θ becomes less than or equal to 90°). The CPU 305 determines a position 54 after rotational movement as the position of the line segment 51 which forms the deformed portion. In this manner, the position of the deformed portion is determined, and its length is specified.

Figure 7:
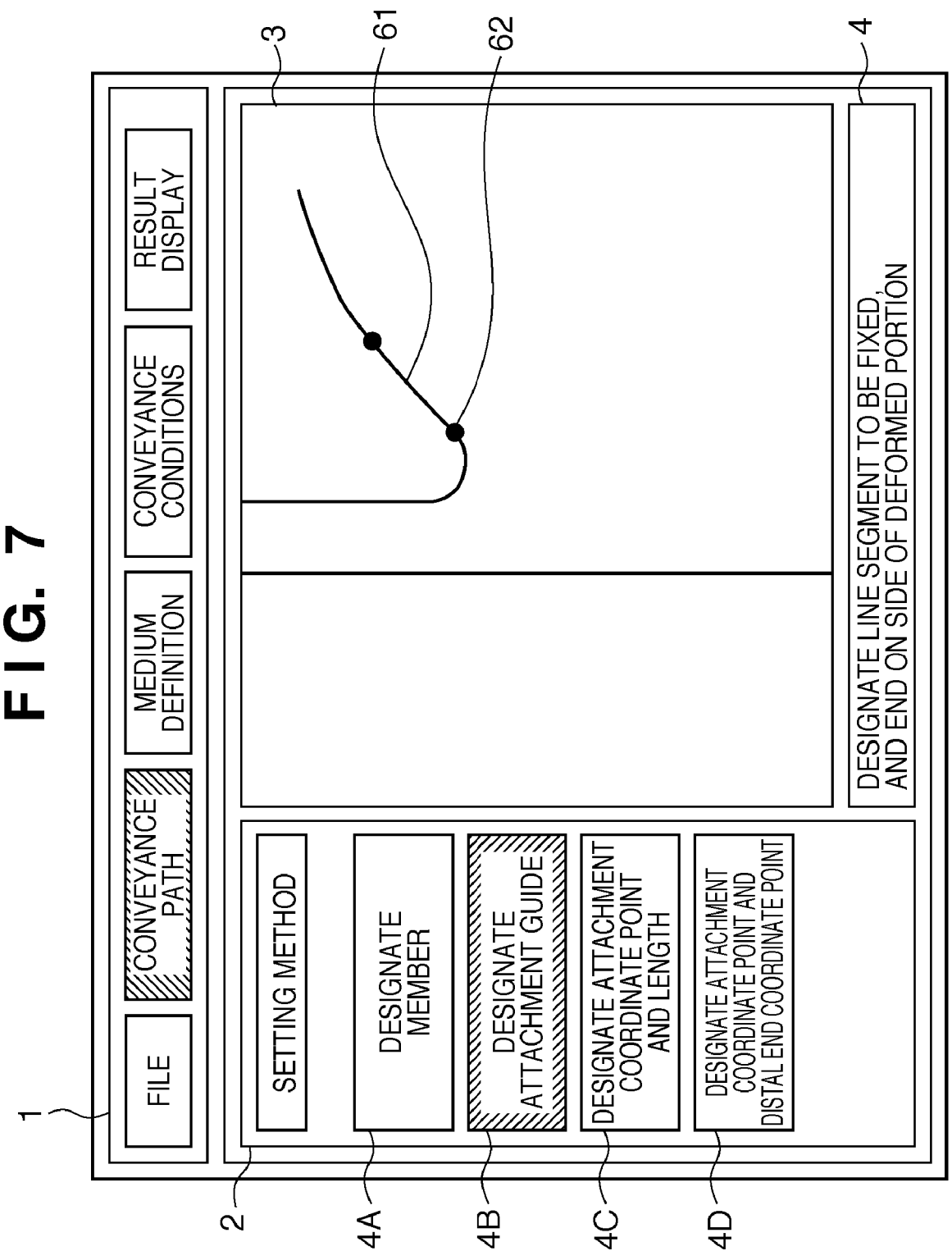
FIG. 7 is a view exemplifying a window displayed when an attachment guide designation button 4B is pressed.
Figure 8:
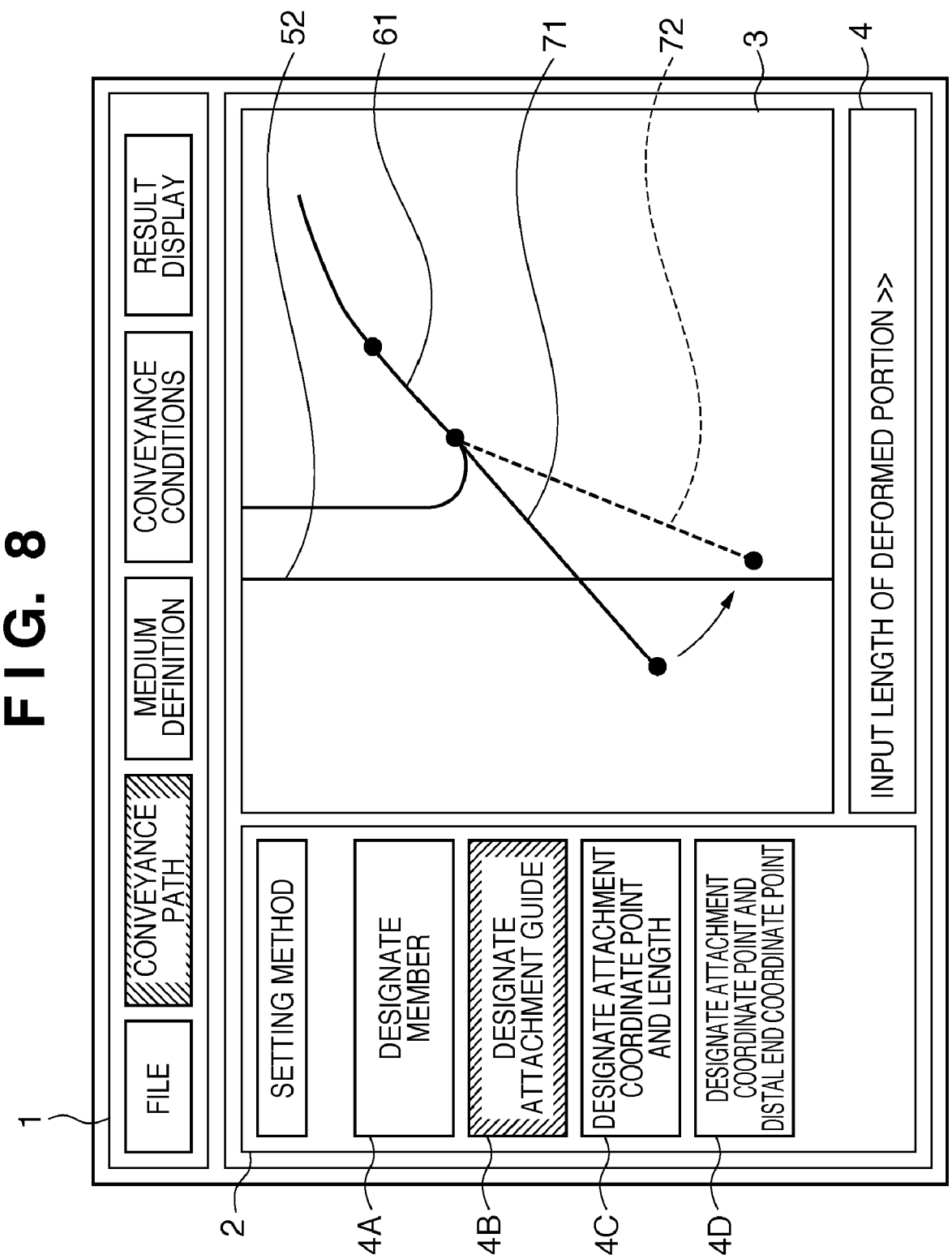
FIG. 8 is a view exemplifying a window displayed when a line segment 61 indicating a portion to which an elastic sheet is attached and fixed, and an end 62 of the line segment 61 are designated.

When the user presses the attachment guide designation button 4B, the CPU 305 displays a message in the command field 4 to prompt him to designate part of a line segment indicating a portion to which the elastic sheet is attached and fixed, and an end on a side on which the deformed portion is to be arranged, as shown in FIG. 7. When the user designates, in the graphic window 3 using the pointing device 304, a line segment 61 indicating a portion to which the elastic sheet is attached and fixed, and an end 62 of the line segment 61, the CPU 305 displays a message in the command field 4 to prompt him to input the length of the deformed portion of the elastic sheet, as shown in FIG. 8. If the user inputs the length of the deformed portion, the CPU 305 stores, as the coordinate points of attachment positions in the RAM 308, the coordinate points of the two ends of the line segment indicating the portion to which the elastic sheet is attached and fixed. The CPU 305 also stores the input length of the deformed portion in the RAM 308.

Then, as shown in FIG. 8, the CPU 305 creates a line segment 71 indicating the deformed portion having the input length on a line extended from the end 62 of the line segment 61. If the line segment 71 crosses the line segment 52 indicating another building member, the CPU 305 rotates and moves the line segment 71, similar to the case in which the user presses the member designation button 4A. The CPU 305 determines a position 72 after rotational movement as the position of the line segment 71 which forms the deformed portion. In this way, the position of the deformed portion is determined, and its length is specified.

Hence, even when a member indicating an elastic sheet itself does not exist in the graphic window 3 (e.g., no elastic sheet exists in design data), the elastic sheet can be arranged, as shown in FIG. 7.

Figure 9:
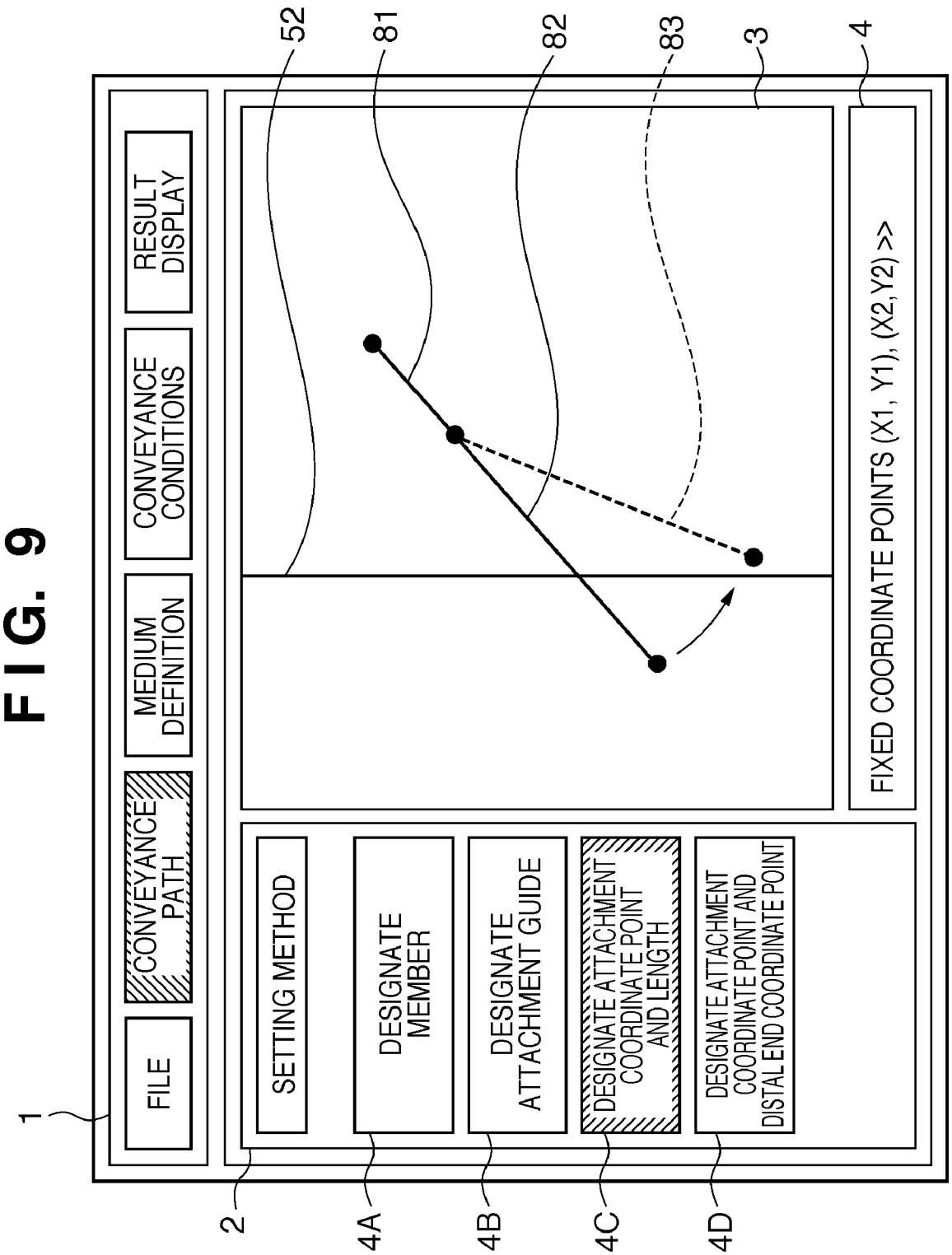
FIG. 9 is a view exemplifying a window displayed when an attachment coordinate point/length designation button 4C is pressed.

When the user presses the attachment coordinate point/length designation button 4C, the CPU 305 displays a message in the command field 4 to prompt him to designate two coordinate points indicating two ends of a portion to which the elastic sheet is attached and fixed, as shown in FIG. 9. For example, one of the two coordinate points that is designated later is set as the coordinate point of an end on a side on which the deformed portion is to be arranged. These coordinate values can be designated by, for example, inputting numerical values to the command field 4 from the keyboard 303. These coordinate values can also be designated by, for example, specifying points in the graphic window 3 using the pointing device 304. After the user designates the two coordinate points, the CPU 305 creates a line segment 81 which connects these two coordinate points, and displays it on the display device 302. The CPU 305 then displays a message in the command field 4 to prompt the user to input the length of the deformed portion of the elastic sheet. When the user inputs the length of the deformed portion, the CPU 305 stores the two designated coordinate points as the coordinate points of attachment positions in the RAM 308. The CPU 305 also stores the input length of the deformed portion in the RAM 308. That is, the line segment 81 indicates a portion to which the elastic sheet is attached and fixed. The user can confirm the attachment position of the elastic sheet from the line segment 81.

After that, as shown in FIG. 9, the CPU 305 creates a line segment 82 indicating the deformed portion having the input length on a line extended from a side (coordinate point input later) of the line segment 81 on which the deformed portion is to be arranged. If the line segment 82 crosses the line segment 52 indicating another building member, the CPU 305 rotates and moves the line segment 82, similar to the case in which the user presses the member designation button 4A. The CPU 305 determines a position 83 after rotational movement as the position of the line segment 82 which forms the deformed portion. As a result, the position of the deformed portion is determined, and its length is specified.

Even when neither a member indicating an elastic sheet itself nor a member which is fixed by attaching the elastic sheet exists in the graphic window 3 (e.g., no elastic sheet exists in design data), the elastic sheet can be arranged, as shown in FIG. 9.

Figure 10:
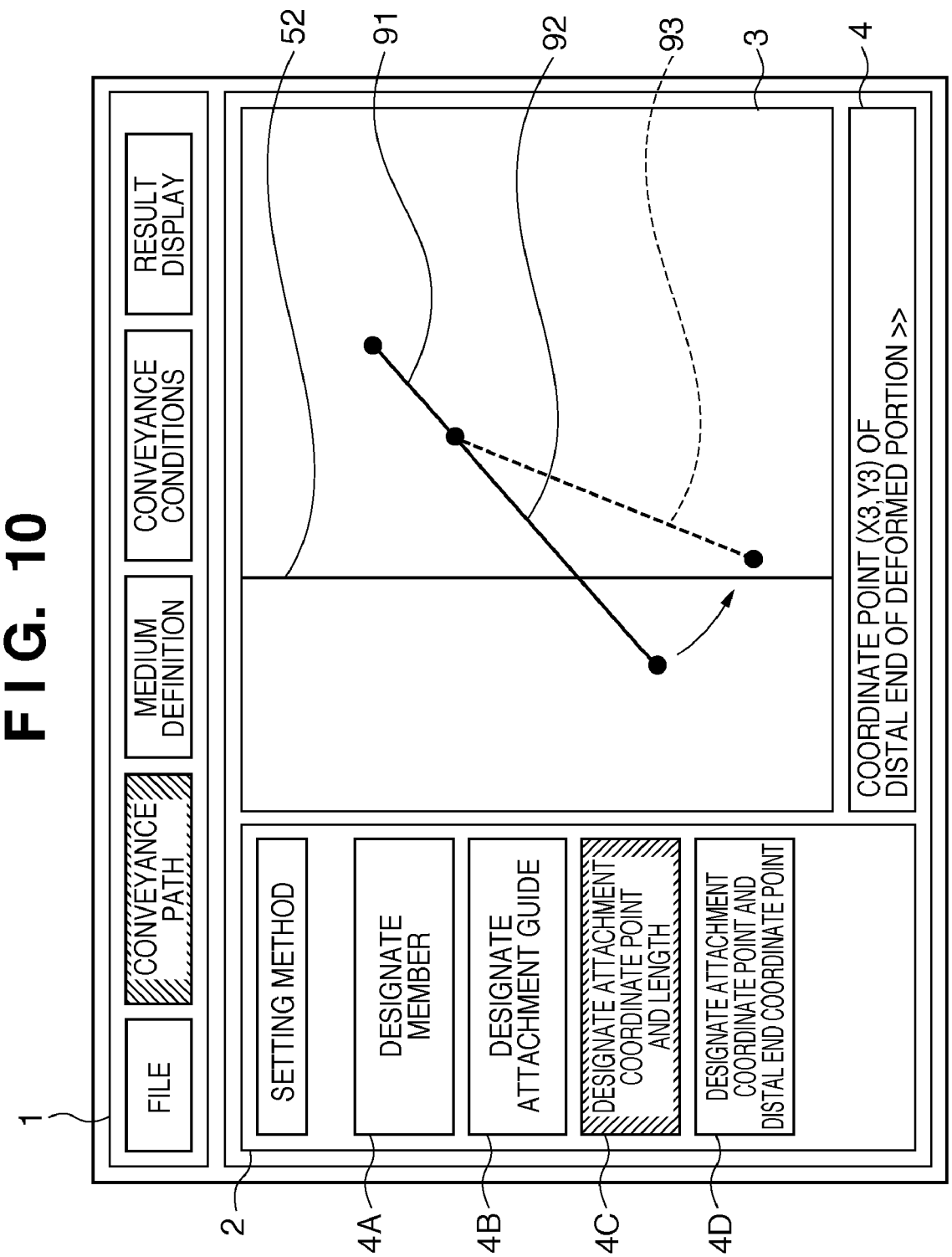
FIG. 10 is a view exemplifying a window displayed when an attachment coordinate point/distal end coordinate point designation button 4D is pressed.

When the user presses the attachment coordinate point/distal end coordinate point designation button 4D, the CPU 305 displays a message in the command field 4 to prompt him to designate two coordinate points (first positions) indicating two ends of a portion to which the elastic sheet is fixed, similar to the case in which the user presses the attachment coordinate point/length designation button 4C. For example, one of the two coordinate points that is designated later is set as the coordinate point of an end on a side on which the deformed portion is to be arranged. These coordinate values can be designated by, for example, inputting numerical values to the command field 4 from the keyboard 303. These coordinate values can also be designated by specifying points in the graphic window 3 using the pointing device 304. After the user designates the two coordinate points, the CPU 305 creates a line segment 91 which connects these coordinate points, and displays it on the display device 302, as shown in FIG. 10. The CPU 305 then displays a message in the command field 4 to prompt the user to designate the coordinate point (second position) of the distal end of the deformed portion of the elastic sheet. This coordinate value can also be designated by, for example, inputting a numerical value to the command field 4 from the keyboard 303. This coordinate value can also be designated by specifying a point in the graphic window 3 using the pointing device 304. After the user designates the coordinate point of the distal end, the CPU 305 stores the two designated coordinate points as the coordinate points of attachment positions in the RAM 308. The CPU 305 also stores, in the RAM 308, the length of the deformed portion that is obtained from the coordinate point of the distal end and the coordinate point of the end on a side on which the deformed portion is to be arranged. That is, the line segment 91 indicates a portion to which the elastic sheet is fixed. The user can confirm the attachment position of the elastic sheet from the line segment 91.

Then, as shown in FIG. 10, the CPU 305 creates a line segment 92 which connects the coordinate point of the end (point indicated by the coordinate point input later) on a side of the line segment 91 on which the deformed portion is to be arranged, and that of the distal end. The CPU 305 arranges the deformed portion on the line segment 92. If the line segment 92 crosses the line segment 52 indicating another building member, the CPU 305 rotates and moves the line segment 92, similar to the case in which the user presses the member designation button 4A. The CPU 305 determines a position 93 after rotational movement as the position of the line segment 92 which forms the deformed portion. In this fashion, the position of the deformed portion is determined, and its length is specified.

Even when neither a member indicating an elastic sheet itself nor a member which is fixed by attaching the elastic sheet exists in the graphic window 3 (e.g., no elastic sheet exists in design data), the elastic sheet can be arranged, as shown in FIG. 10. In addition, the degree of freedom of the elastic sheet shape increases.

As described above, the CPU 305 specifies a deformed portion and its length regardless of a pressed button.

Figure 11:
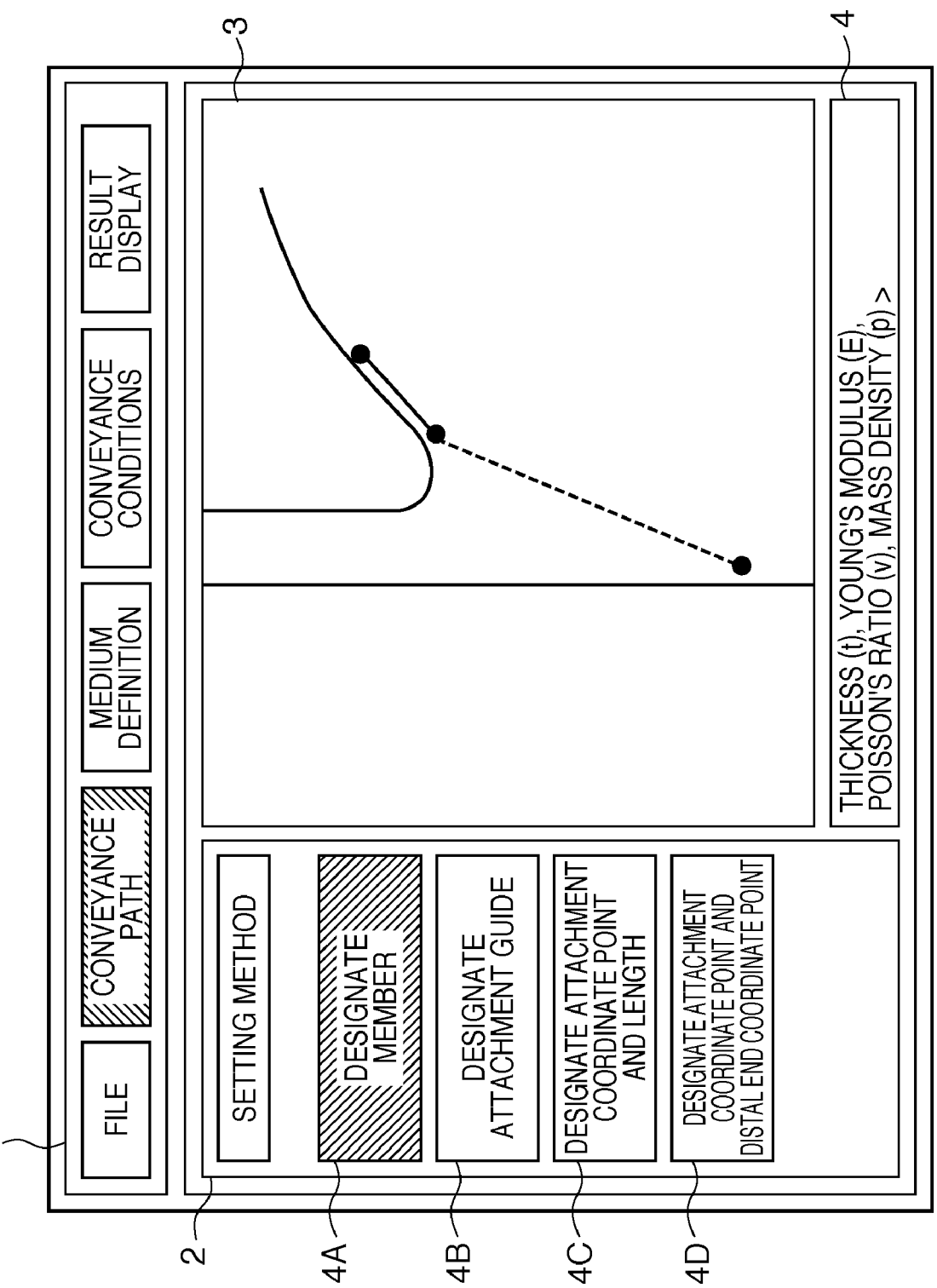
FIG. 11 is a view exemplifying a message which prompts the user to input the thickness and material of an elastic sheet.

After the end of specifying the deformed portion of the elastic sheet, the CPU 305 displays a message in the command field 4 to prompt the user to input the thickness and material (Young's modulus, Poisson's ratio, and mass density) of the elastic sheet, as shown in FIG. 11. The CPU 305 sets the rigidity of the elastic sheet based on the thickness and material of the elastic sheet. After these values are input, the CPU 305 stores them in the RAM 308, ending the processing regarding the arrangement of the elastic sheet.

In this way, processing (step S1) regarding definition of the elastic sheet is done.

Next, processing (step S2) regarding division into rigid elements, and calculation (step S3) of the angle of the rigid element will be explained. In the processing regarding division into rigid elements, and the calculation of the angle of the rigid element, the elastic sheet is defined as an elastic member.

<Definition of Elastic Sheet as Elastic Member>

Figure 12:
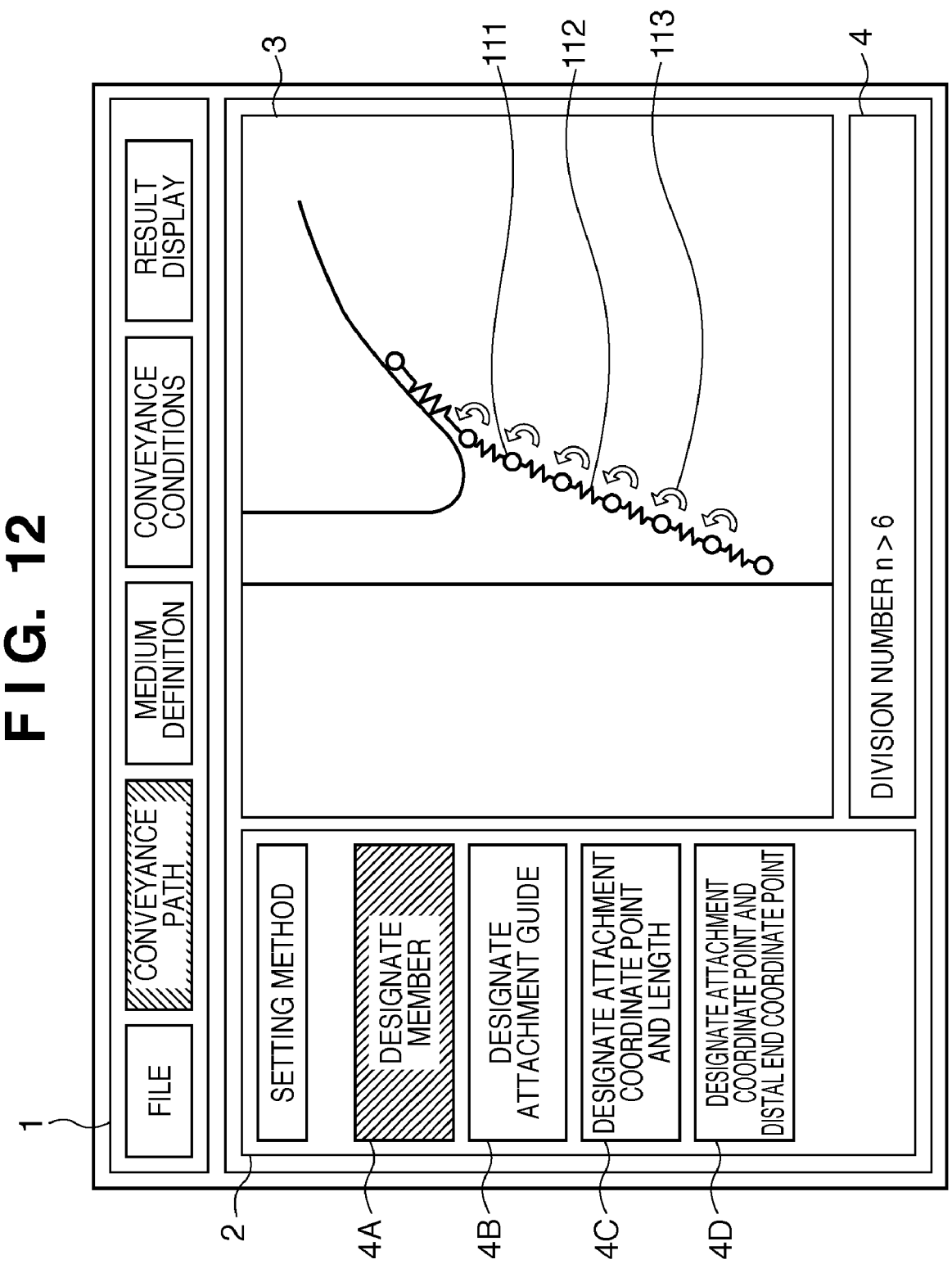
FIG. 12 is a view exemplifying a window displayed when defining an elastic sheet as an elastic member.

FIG. 12 is a view exemplifying a window displayed when defining an elastic sheet as an elastic member. After arranging the elastic sheet, the CPU 305 defines rigid elements at two coordinate points of the attachment position, and defines a spring which connects the two rigid elements. The CPU 305 gives a constraint condition to the two rigid elements and defines them so as to inhibit displacement in the translational direction and rotational direction. As shown in FIG. 12, the CPU 305 displays a message in the command field 4 to prompt the user to input the division number or division size when discretizing the deformed portion of the elastic sheet into a plurality of spring-mass systems. FIG. 12 shows a window when the division number is 6. A rotational spring 113 which connects mass points 111 expresses a flexural rigidity when the elastic sheet is regarded as an elastic member. A translational spring 112 expresses a tensile rigidity. The constants of the springs 112 and 113 can be derived from an elastic theory. The rotational spring constant kr and translational spring constant ks are given using Young's modulus E, width w, thickness t, and distance $\Delta L$ between mass points:

$$kr = \frac{Ewt^3}{12\Delta L}, ks = \frac{Ewt}{\Delta L} \qquad [\text{Mathematical 1}]$$

$$\Delta L = \frac{\sqrt{(x_2 - x_1)^2 + (y_2 - y_1)^2}}{n}$$

The mass m of the mass point is given using the length L and w of the elastic sheet, the thickness t of the elastic sheet, the density $\rho$, and the division number n:

$$m = Lwt\rho/(n-1) \qquad [\text{Mathematical 2}]$$

Figure 13A:
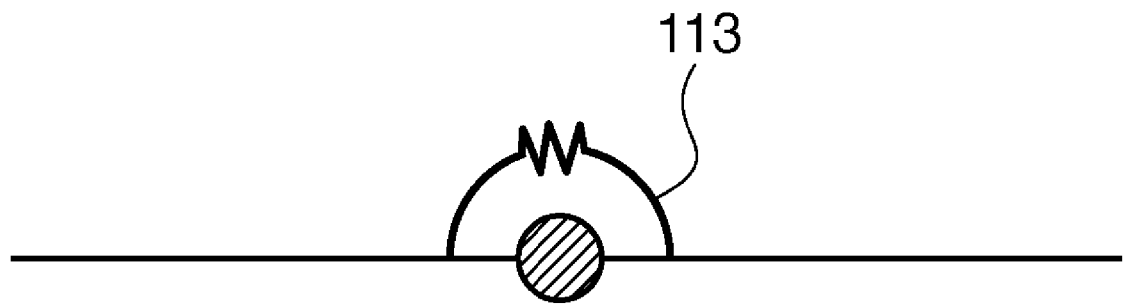
FIG. 13A is a view showing the restoring force of a rotational spring.
Figure 13B:
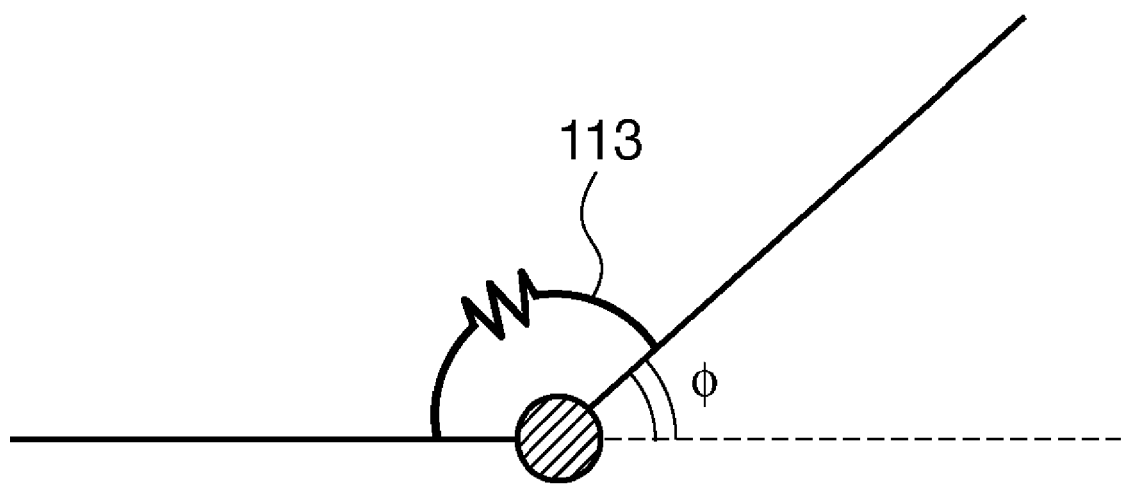
FIG. 13B is a view showing the restoring force of the rotational spring.

The restoring force of the rotational spring will be explained. FIGS. 13A and 13B are views showing the restoring force of the rotational spring. When defining an elastic sheet as an elastic member, the CPU 305 assumes that the rotational spring 113 generates a restoring force on the elastic sheet against flexure. The restoring force is a force to return a deformed shape to a shape before deformation. Assuming that the restoring force is 0 in a state in which rigid elements are aligned, as shown in FIG. 13A, a restoring force to restore the linear shape is generated in a state in which they have an angle $\phi$, as shown in FIG. 13B.

Figure 20:
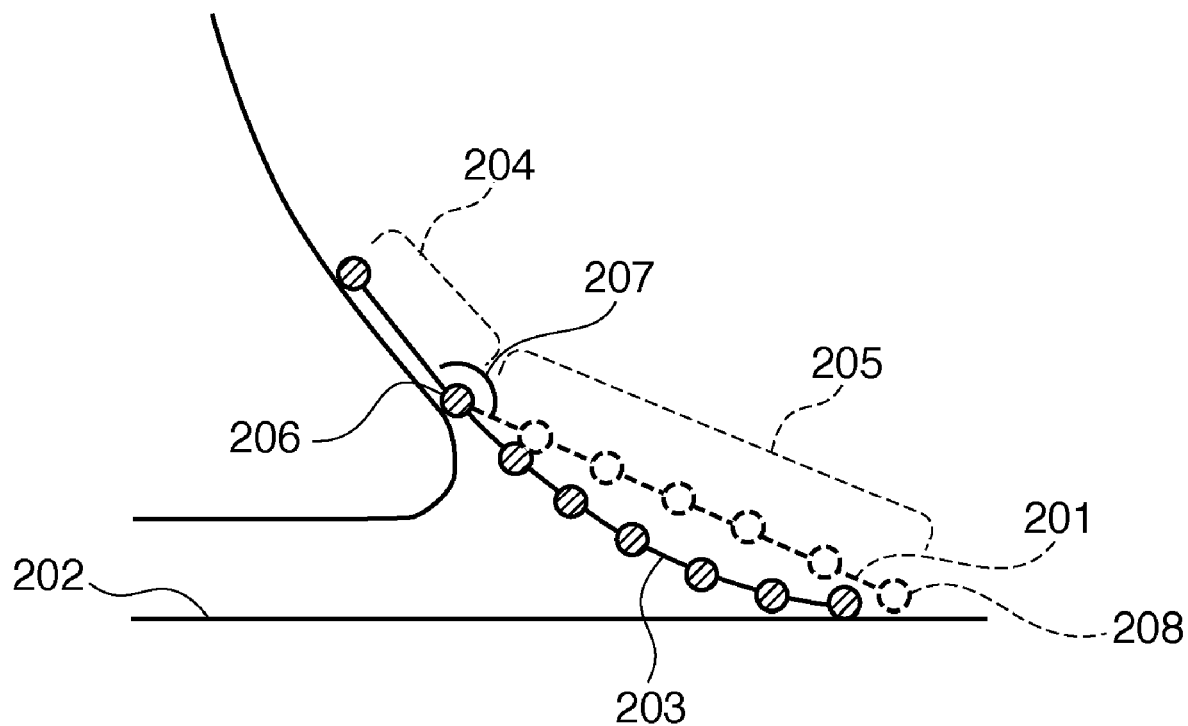
FIG. 20 is a view showing an outline of the behavior simulation of an elastic sheet.

In the embodiment, when the angle between adjacent rigid elements is not 0°, the CPU 305 performs the behavior simulation of the elastic sheet on the premise that the restoring force acts on the elastic sheet to return the angle to 0°. Then, the CPU 305 calculates the motion of a flexible medium (step S6). FIG. 20 is a view showing an outline of the behavior simulation of the elastic sheet. In FIG. 20, a fixed portion 204 and deformed portion 205 of the elastic sheet are set. The elastic sheet is defined by rigid elements and springs which connect them while forming an initial angle 207 at a fulcrum 206 at the boundary between the fixed portion and the deformed portion. The contact is defined between a rigid element 208 which forms an elastic sheet 201, and a conveyance guide 202. Then, the behavior simulation of the elastic sheet starts. After the start of calculation, a restoring force to restore the linear shape is generated on the elastic sheet 201. The elastic sheet 201 deforms while coming into contact with the conveyance guide 202. Finally, an elastic sheet 203 which is curved along the conveyance guide 202 is obtained, and the angles of rigid elements which form the elastic sheet 203 are obtained.

In this manner, the CPU 305 defines the model of an elastic sheet as an elastic member which reacts to flexural and tensile forces. The CPU 305 performs processing (step S2) regarding division into rigid elements, and calculation (step S3) of the angle of the rigid element.

Next, processing (step S4) regarding the definition of a flexible medium will be described. In the definition of a flexible medium, the flexible medium is defined as an elastic member. When defining the flexible medium as an elastic member, the flexible medium is also arranged.

<Definition of Flexible Medium as Elastic Member (Including Arrangement of Flexible Medium)>

Figure 14:
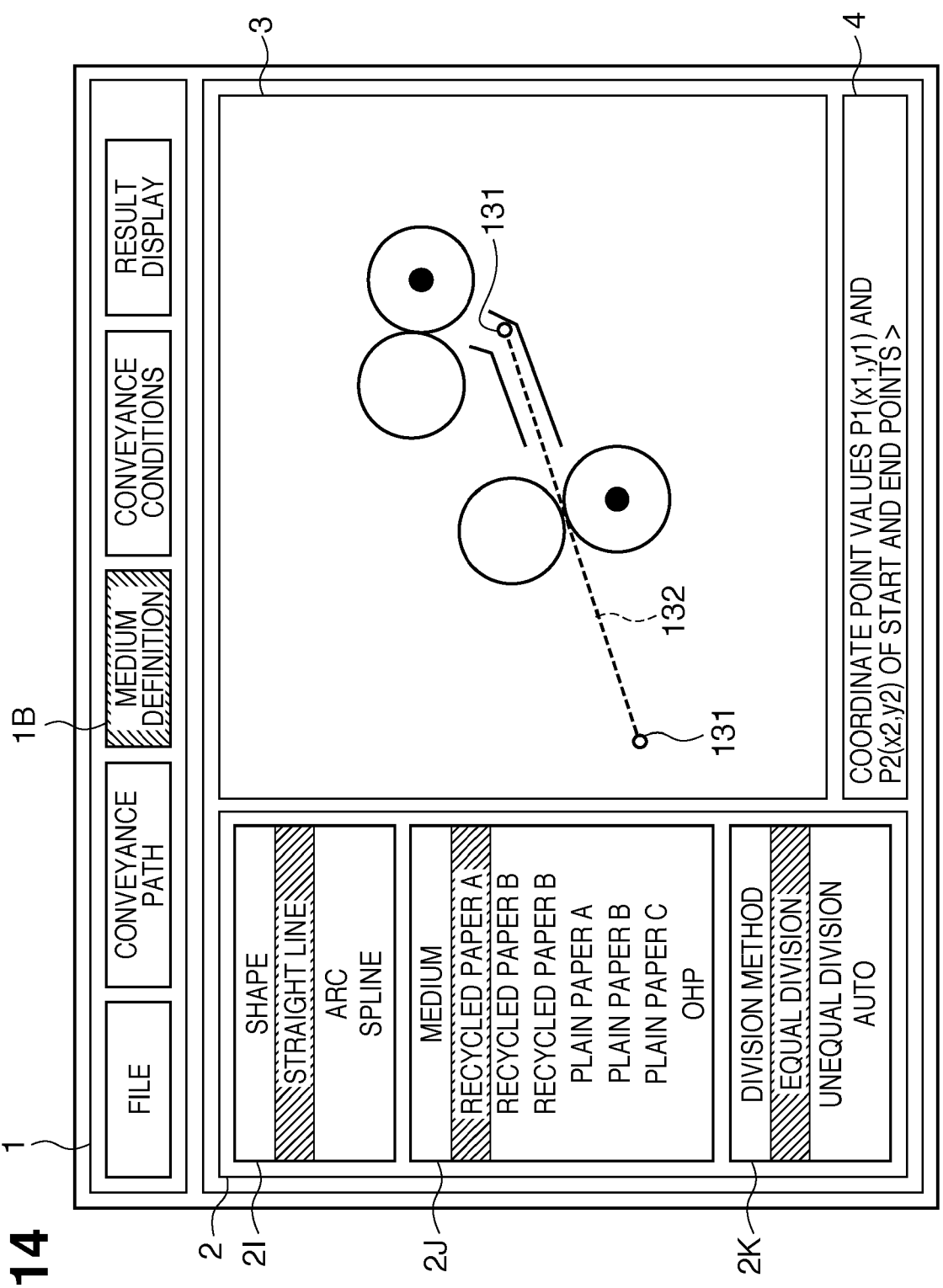
FIG. 14 is a view exemplifying a window displayed when defining a flexible medium as an elastic member.

FIG. 14 is a view exemplifying a window displayed when defining a flexible medium as an elastic member. When the user presses a "medium definition" button 1B in the menu bar 1, the CPU 305 displays, on the display device 302, a submenu 2 for defining a flexible medium as an elastic member, as shown in FIG. 14. At this time, the CPU 305 sets the window so that it contains building components (e.g., elastic sheet) in the conveyance path that have already been defined in the above-described manner. The submenu 2 for defining a flexible medium as an elastic member includes a rendering shape selection window 21 for inputting the initial position and initial shape of a flexible medium in the conveyance path, and a medium type selection window 2J for selecting the type of flexible medium. Further, the submenu 2 includes a division method selection window 2K for selecting how to divide a flexible medium.

When the CPU 305 detects that the user has selected a rendering shape from the rendering shape selection window 21, it displays, in the command field 4, a message which is determined in advance for the selected shape. For example, if the user selects "straight line" in the rendering shape selection window 21, the CPU 305 displays a message in the command field 4 to prompt him to input the coordinate values of the two ends of the flexible medium. These coordinate values can be designated by, for example, inputting numerical values to the command field 4 from the keyboard 303. These coordinate values can also be designated by, for example, specifying points in the graphic window 3 using the pointing device 304. After the user designates the two coordinate points, the CPU 305 creates, in the graphic window 3, a straight line 132 which connects two ends 131 indicated by these coordinate points. The CPU 305 presents, to the user, how to set the flexible medium in the conveyance path. In this fashion, the flexible medium is arranged.

Figure 15:
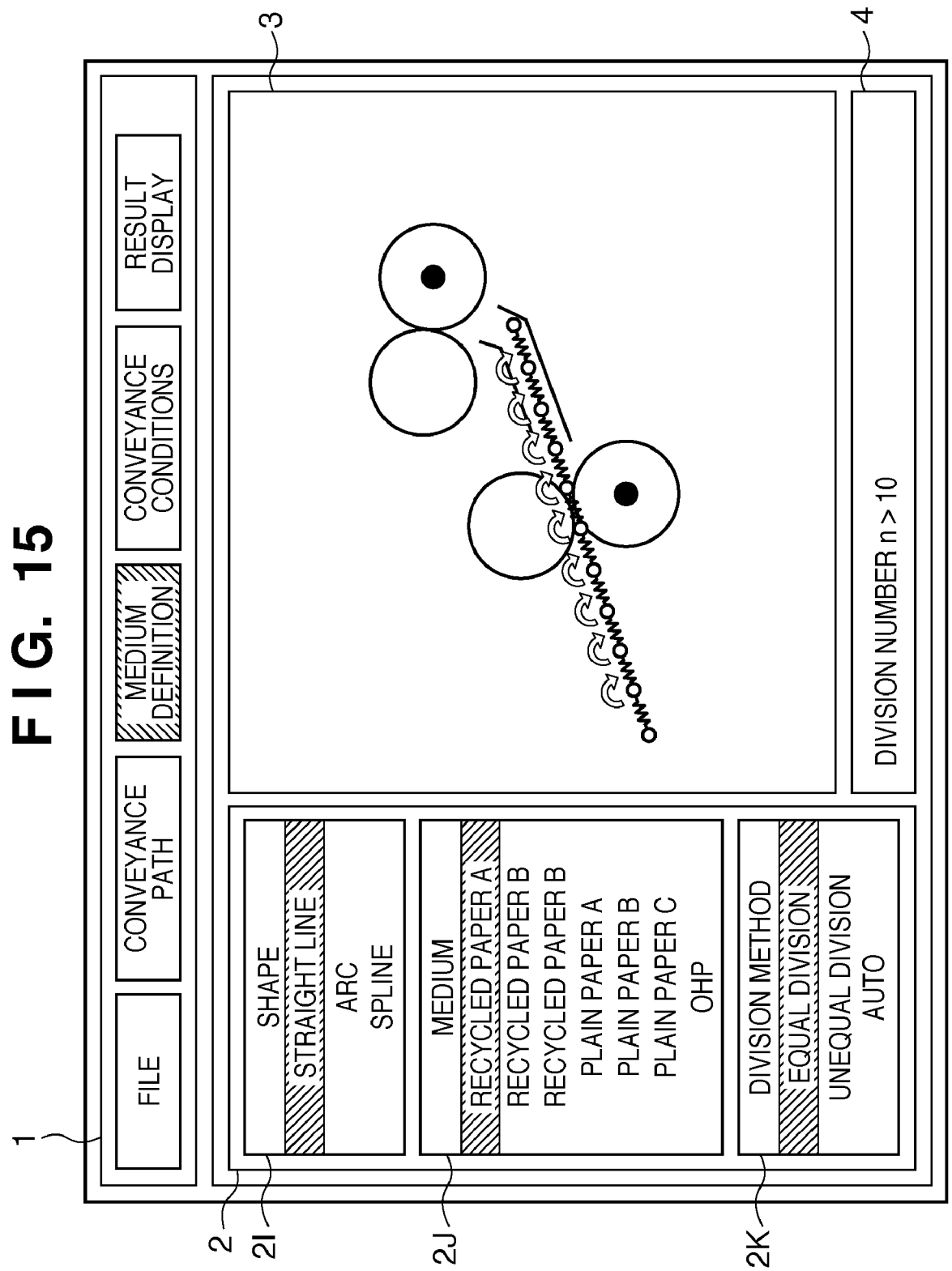
FIG. 15 is a view exemplifying a message which prompts the user to input the division number or division size when discretizing a flexible medium into a plurality of spring-mass systems.

Thereafter, the CPU 305 displays a message in the command field 4 to prompt the user to input the division number or division size when discretizing a flexible medium into a plurality of spring-mass systems, as shown in FIG. 15. FIG. 15 shows a window when the user selects "straight line" in the rendering shape selection window 21, selects "equal division" in the division method selection window 2K, and sets a division number of 10.

The medium type selection window 2J displays flexible medium types so as to be able to select one or more types. For example, one flexible medium type (e.g., "recycled paper A") is selected as a default, as shown in FIGS. 14 and 15. The user can select another type using the keyboard 303, pointing device 304, or the like. These flexible medium types can be registered in a database prior to the design. For example, general-purpose types are preferably registered. In registration in the database, for example, parameters such as Young's modulus, density, and thickness which are used to calculate the behavior of a flexible medium are also registered for each printing medium type. By registering parameters, parameters for a flexible medium selected from the medium type selection window 2J can be easily read out and used. Assume that parameters "Young's modulus: 5409 MPa, density: $6.8\times10^{-7}$ $kg/mm^3$, and thickness: 0.0951 mm" have been registered in advance in the database for recycled paper A.

After the user makes selections in the rendering shape selection window 21, medium type selection window 2J, and division method selection window 2K and inputs information (e.g., coordinate value) corresponding to the selection state, the CPU 305 defines rigid elements at the two ends of a flexible medium, and defines a spring which connects these two rigid elements. That is, the CPU 305 performs the same processing as that when defining an elastic sheet as an elastic member. A rotational spring which connects mass points expresses a flexural rigidity, and a translational spring expresses a tensile rigidity. The constants of these springs can be derived from an elastic theory and calculated according to the above-described equations (1) and (2).

In this way, the CPU 305 defines the model of a flexible medium as an elastic member which reacts to flexural and tensile forces.

The CPU 305 performs processing (step S4) regarding the definition of a flexible medium.

Next, processing (step S5) regarding setting of conveyance conditions will be explained. When setting conveyance conditions, the friction coefficient is also defined.

<Setting of Conveyance Conditions (Including Definition of Friction Coefficient>

Figure 16:
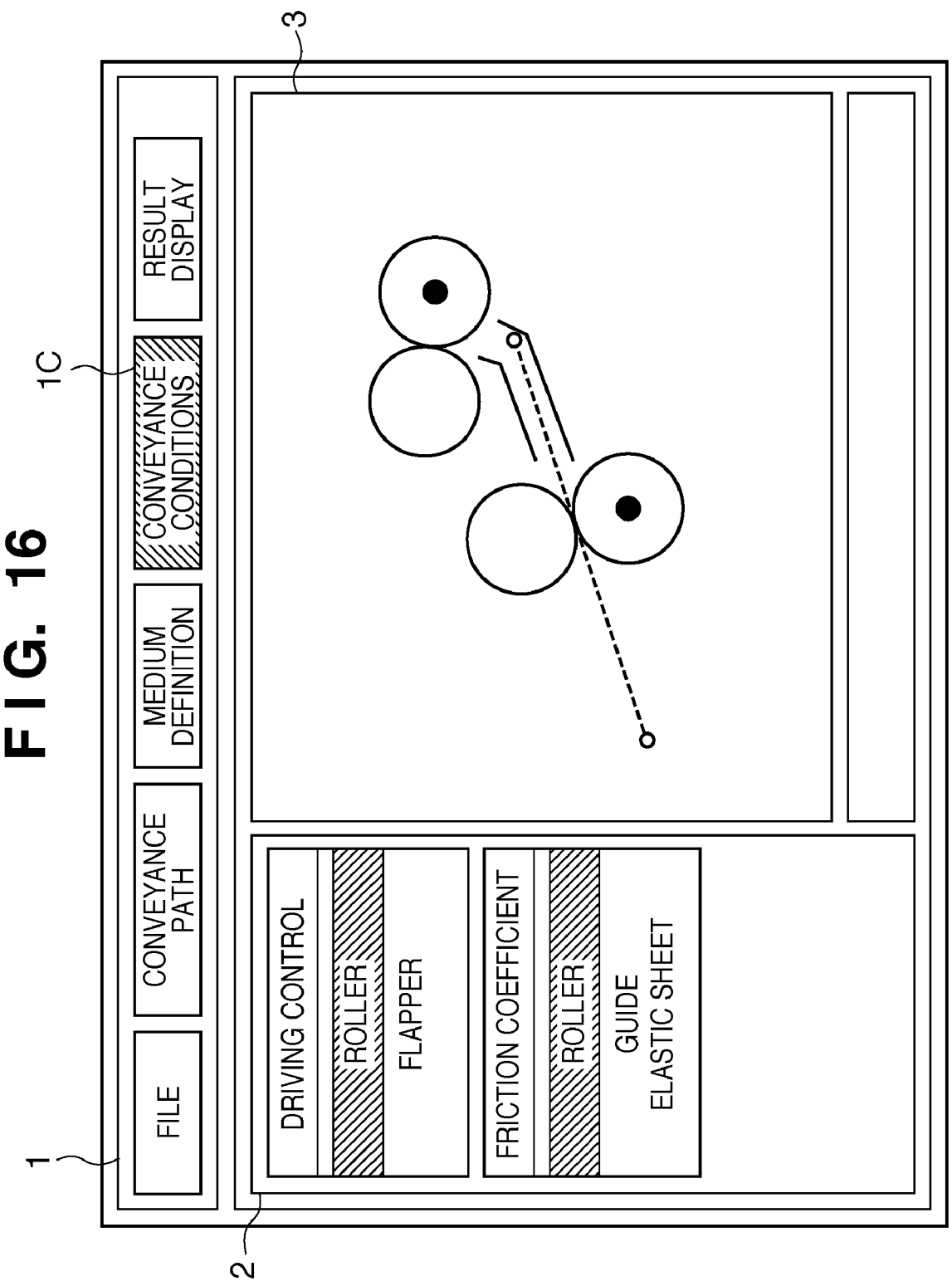
FIG. 16 is a view exemplifying a window displayed when a "conveyance conditions" button 1C is pressed.
Figure 17:
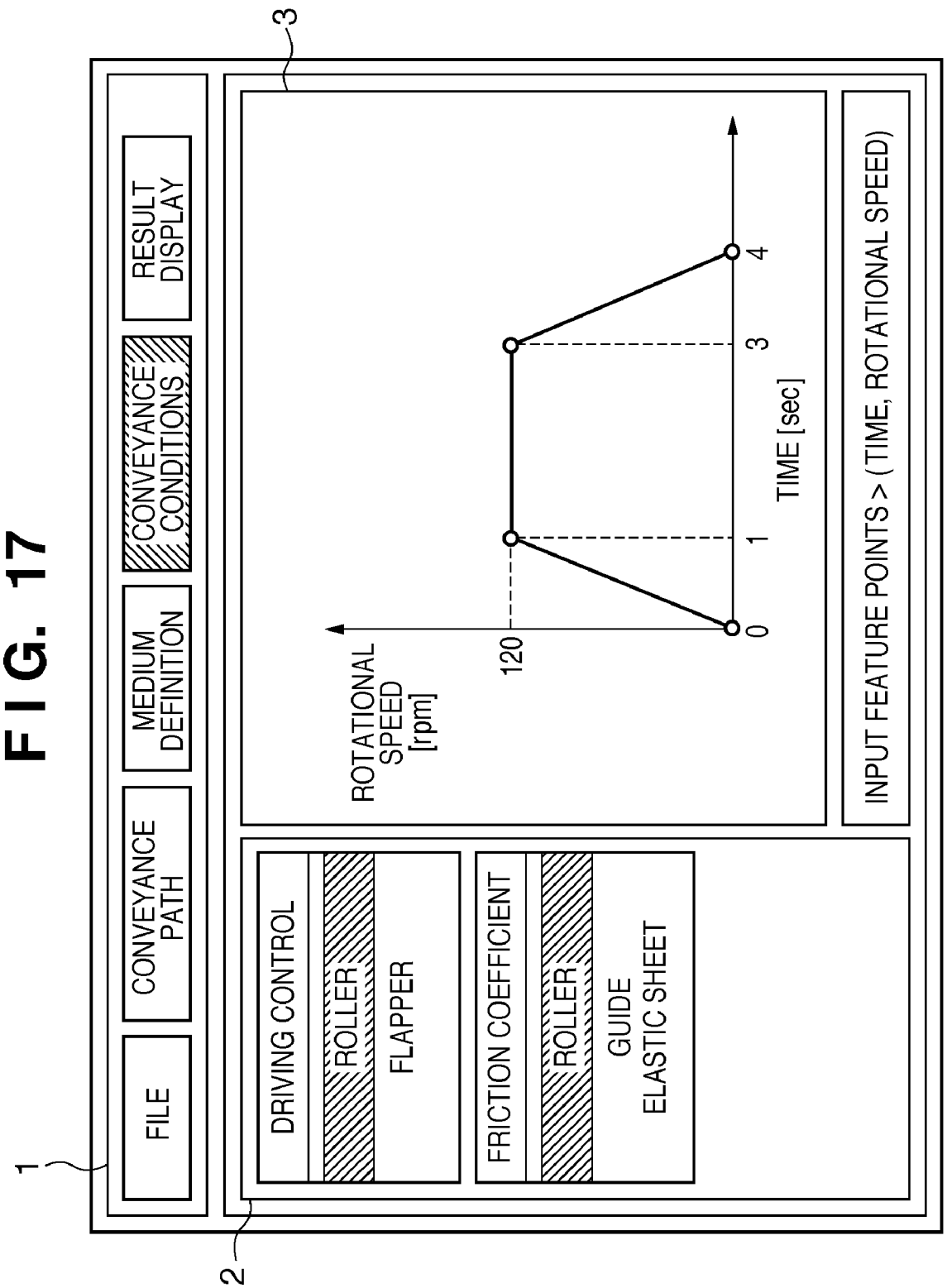
FIG. 17 is a view exemplifying a window displayed when the time and the rotational speed of a roller are input as feature points to a command field 4.

After defining a flexible medium as an elastic member, the CPU 305 sets conveyance conditions. In the conveyance condition setting processing, the driving conditions of conveyance rollers, and friction coefficients upon contact of a flexible medium with a conveyance guide, conveyance roller, and elastic sheet are defined. FIGS. 16 and 17 are views exemplifying windows displayed when setting conveyance conditions. When the user presses a "conveyance conditions" button 1C in the menu bar 1, the CPU 305 displays a conveyance condition setting submenu 2, as shown in FIG. 16. The conveyance condition setting submenu 2 includes buttons for defining driving conditions, friction coefficients, and conveyance rollers. FIG. 16 shows an input example of driving control of conveyance rollers. More specifically, "roller" is selected from driving conditions in the submenu 2 ("roller" is highlighted in FIG. 16).

While selecting "roller" in the submenu 2, the user selects one of conveyance rollers displayed in the graphic window 3, and inputs the time and the rotational speed of the roller as feature points in the command field 4. Then, the CPU 305 displays, in the graphic window 3, a graph representing a change of the rotational speed of the roller with respect to the time, as shown in FIG. 17. For example, when the user inputs a pair of time and rotational speed as feature points to the command field 4, as needed, the CPU 305 creates and displays a graph in the graphic window 3. FIG. 17 shows a graph in which the rotational speed of the conveyance roller is linearly accelerated from 0 to 120 rpm in a period of 0 to 1 sec, and maintains 120 rpm in a period of 1 to 3 sec, and is decelerated from 120 to 0 rpm in a period of 3 to 4 sec.

While "roller", "guide", or "elastic sheet" is selected in the submenu 2, the CPU 305 accepts input of the friction coefficient μ from the command field 4. For one of a conveyance roller, conveyance guide, and elastic sheet displayed in the graphic window 3, the CPU 305 accepts input of the friction coefficient μ of this component with a flexible medium from the command field 4.

Figure 18:
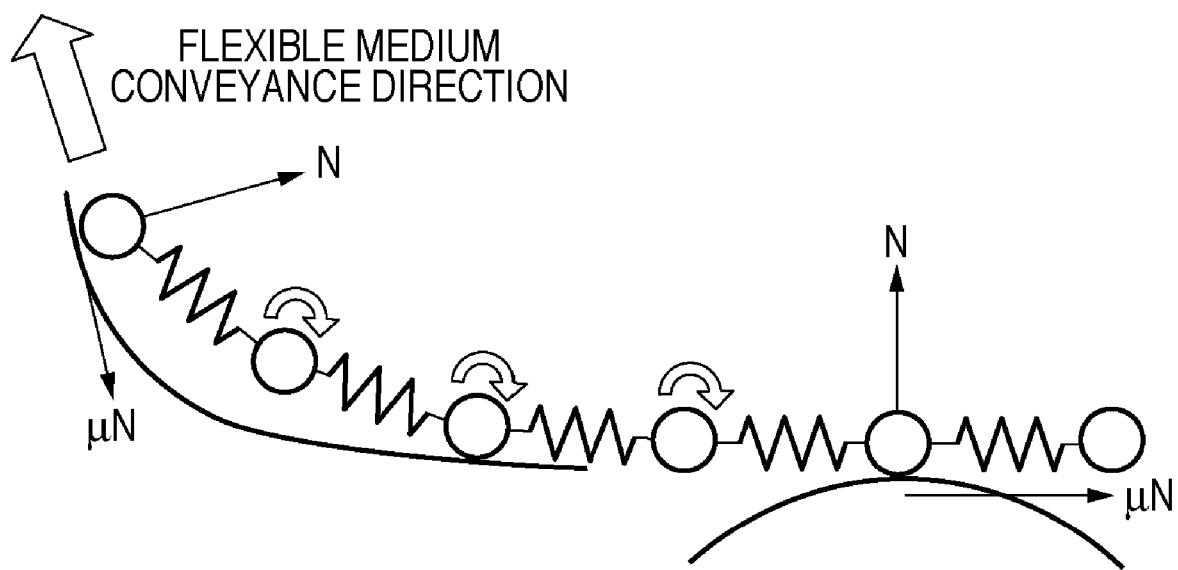
FIG. 18 is a view showing the relationship between the normal force and the frictional force.

Let N be the normal force obtained by calculating the contact between the mass point of a flexible medium, and a conveyance roller, conveyance guide, or elastic guide, as shown in FIG. 18. Then, the frictional force μN acts between the flexible medium and the component in a direction opposite to the flexible medium conveyance direction.

In this fashion, processing (step S5) regarding setting of conveyance conditions is executed.

Figure 19:
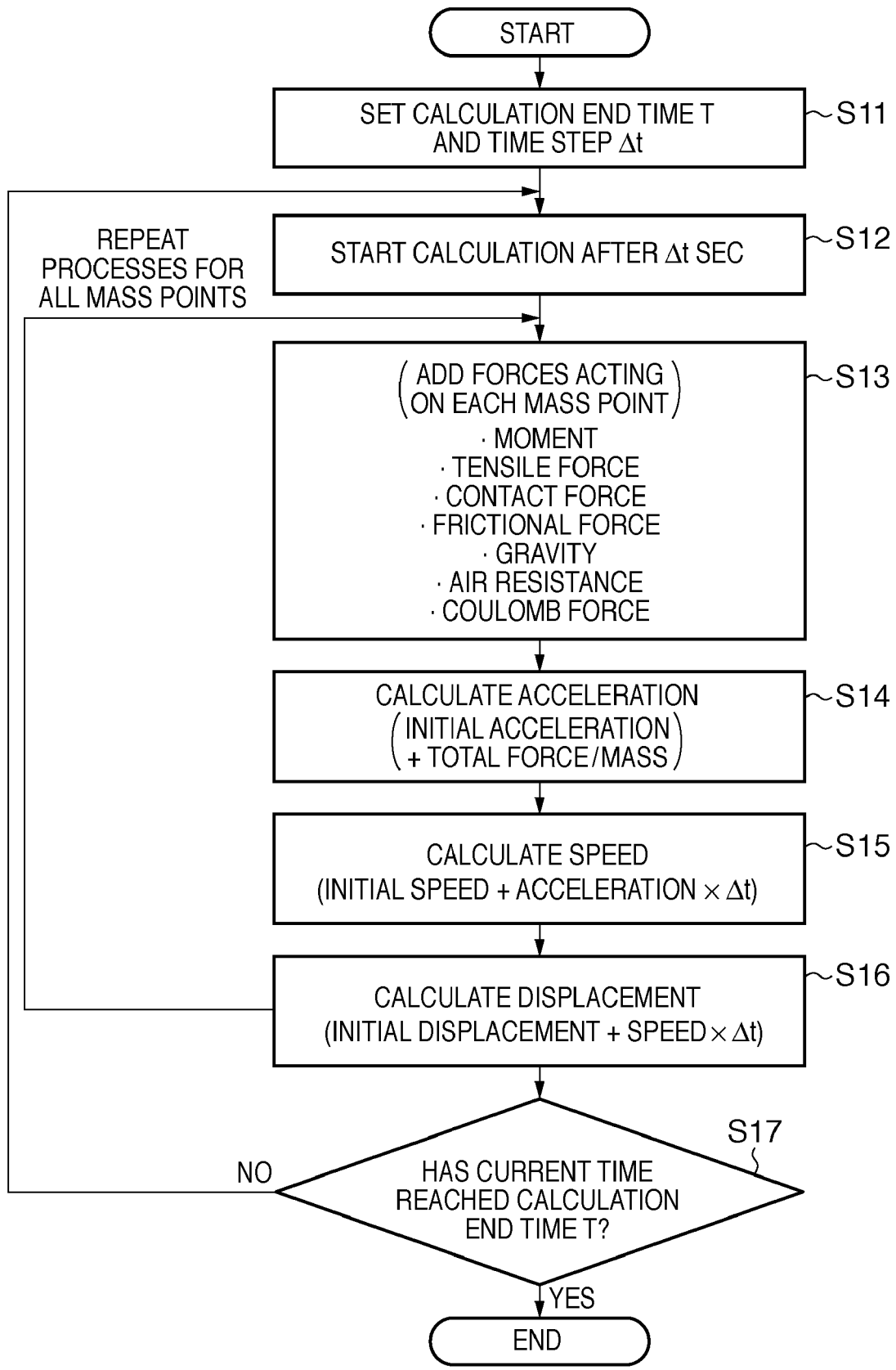
FIG. 19 is a flowchart showing the contents of motion calculation (behavior simulation)

Next, processing (step S6) regarding execution of motion calculation will be explained. FIG. 19 is a flowchart showing the contents of motion calculation (behavior simulation).

In the behavior simulation, the CPU 305 first sets the actual time (calculation end time) T for calculating the motion of a flexible medium, and the time step Δt (sec) of numerical time integration used to numerically obtain the solution of the equation of motion (step S11). Subsequent steps S12 to S16 form a numerical time integration loop. The motion of the flexible medium is calculated in every Δt from the initial time, and the RAM 308 saves the result.

Subsequently, the CPU 305 sets an initial acceleration, initial speed, and initial displacement necessary to perform calculation after Δt (step S12). As these values, calculation results are input every time one cycle ends (i.e., calculation values in a previous cycle are used as initial values).

Figure 21:
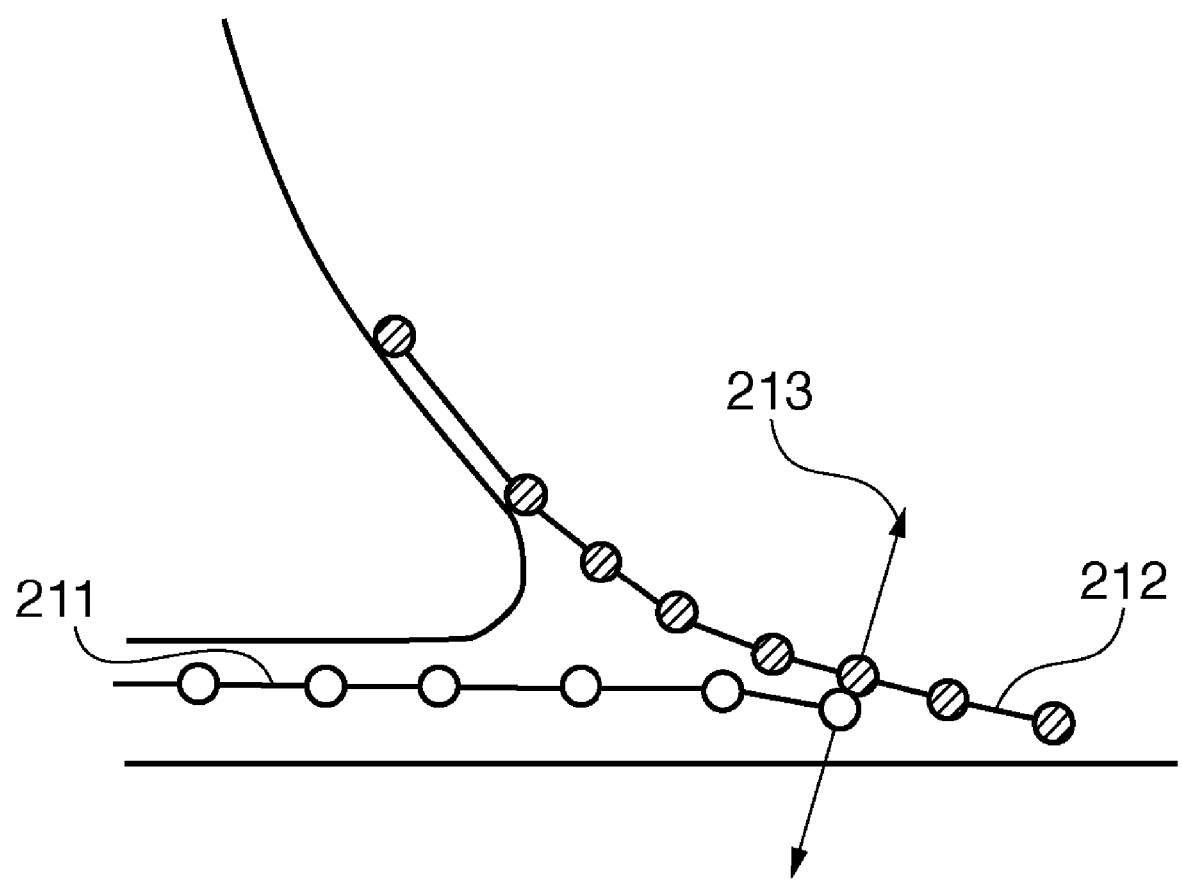
FIG. 21 is a view showing a contact force when a flexible medium and elastic sheet come into contact with each other.

The CPU 305 defines forces which act on each of mass points that form the flexible medium and elastic sheet (step S13). Forces used in calculation are the rotation moment, the restoring force expressed by the tensile force, the contact force, the frictional force, the gravity, the air resistance, and the Coulomb force. At this time, when the flexible medium is conveyed and comes into contact with the elastic sheet, as shown in FIG. 21, the contact force is generated between a flexible medium 211 and an elastic sheet 212, and added as a force which acts on each of mass points that form the flexible medium and elastic sheet. Especially at a mass point which forms the elastic sheet, a contact force generated upon contact with the flexible medium is handled as a force used in calculation, in addition to the restoring force to restore a linear shape, the gravity, and the air resistance. The CPU 305 calculates forces which act on each of the mass points of the flexible medium and elastic sheet. The CPU 305 finally defines the resultant force (total force) as a force which acts on the flexible medium or elastic sheet.

The CPU 305 divides, by the mass of each mass point, the total force acting on the mass point that has been calculated in step S13. The CPU 305 adds the initial acceleration to the quotient, obtaining an acceleration at the mass point after Δt sec (step S14).

The CPU 305 multiplies the acceleration obtained in step S14 by Δt, and adds the initial speed to the product, obtaining a speed at the mass point after Δt sec (step S15).

The CPU 305 multiplies the speed obtained in step S15 by Δt, and adds the initial displacement to the product, obtaining a displacement at the mass point after Δt sec (step S16).

By repeating the calculation processes in steps S13 to S16, the CPU 305 obtains displacements at all mass points after Δt sec. The embodiment adopts the Euler time integration method for a series of calculation processes of physical quantities after Δt sec in steps S13 to S16. However, another time integration method such as the Kutta-Merson method, Newmark β method, or Wilson θ method is also available.

Thereafter, the CPU 305 determines whether the actual time T set in step S11 has elapsed (step S17).

If the actual time T has elapsed, the CPU 305 ends the analysis of the conveyance path. If the actual time T has not elapsed, the CPU 305 repeats the processes in steps S12 to S16.

In this manner, processing (step S6) regarding execution of motion calculation is done.

Next, processing (step S7) regarding display of the motion calculation result will be described.

<Display of Result>

Figure 22:
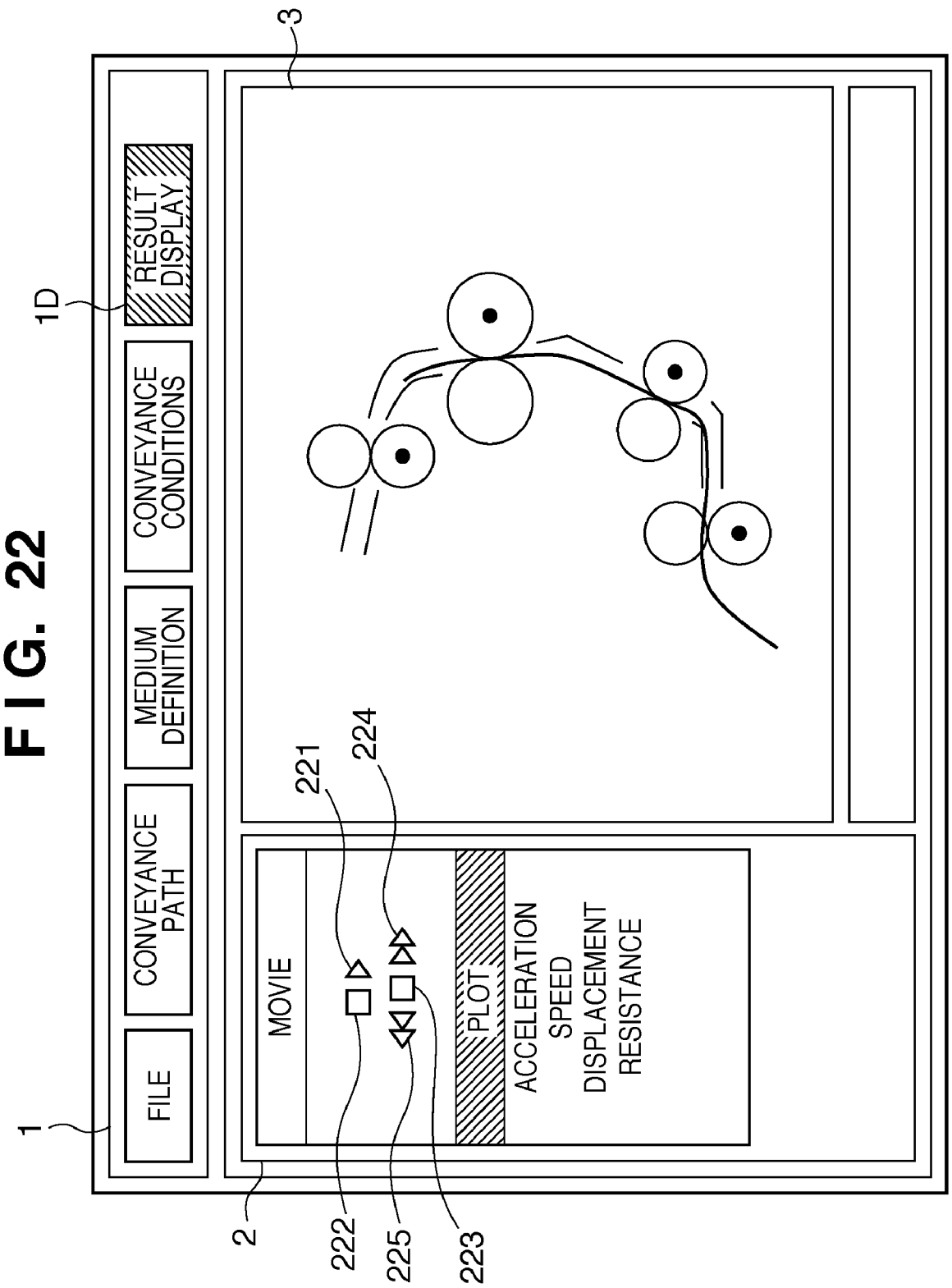
FIG. 22 is a view exemplifying a window displayed in result display processing.

FIG. 22 is a view exemplifying a window displayed in result display processing. When the user presses a "result display" button 1D in the menu bar 1, the CPU 305 displays a result display submenu 2, as shown in FIG. 22. The result display submenu 2 includes a movie menu and plot menu. The result display submenu 2 allows the user to select the contents of the movie and plot.

For example, the movie menu includes a playback button 221, stop button 222, pause button 223, fast-forward button 224, and rewind button 225. In accordance with the manipulation of these buttons, the CPU 305 displays the behavior of a flexible medium in the graphic window 3. The user can visually check the behavior of the flexible medium.

Figure 23:
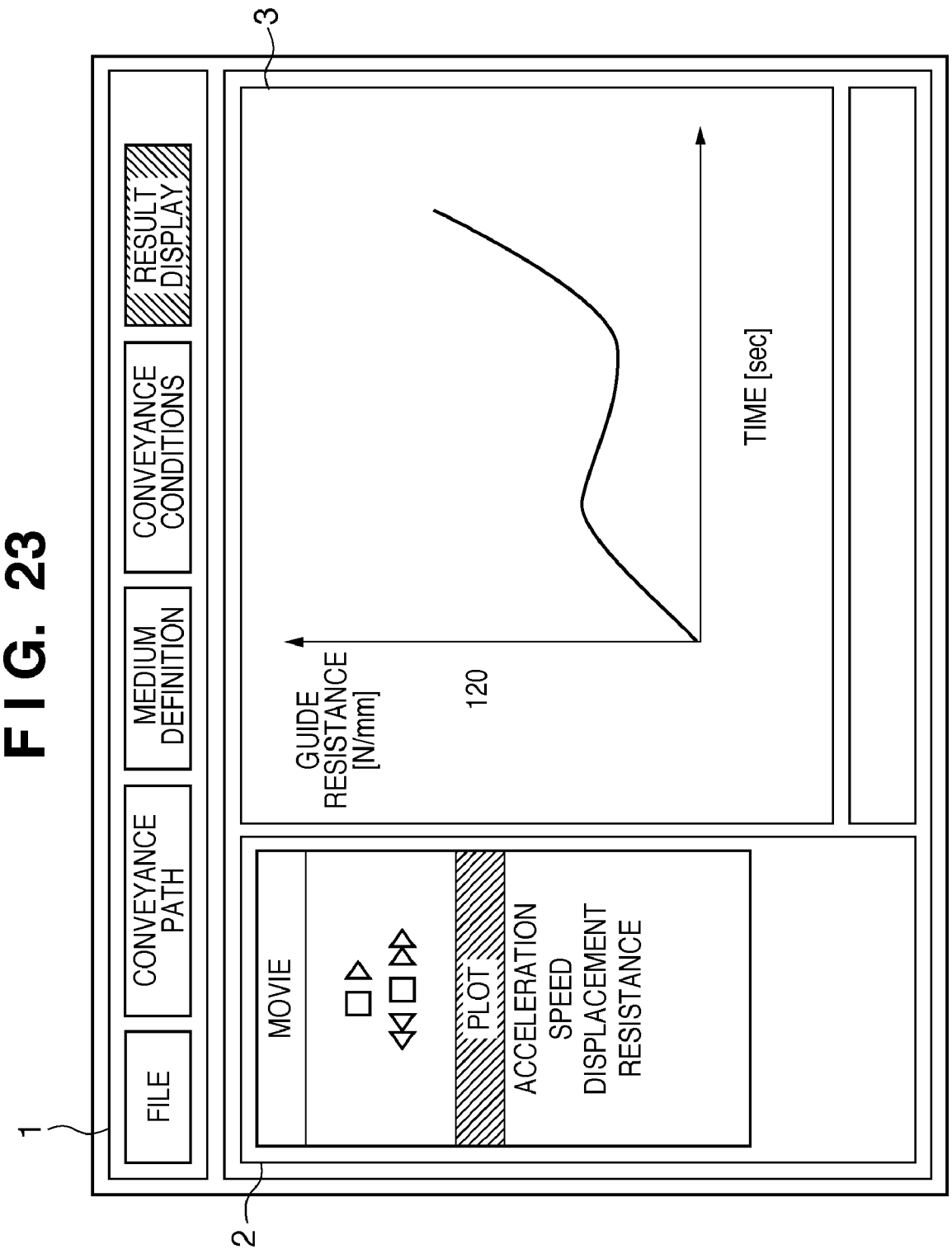
FIG. 23 is a view exemplifying a window displayed in graph display processing.

The plot menu includes, for example, acceleration, speed, displacement, and resistance buttons. If the user selects one of these buttons, the CPU 305 displays the time-series graph of the selected item in the graphic window 3. FIG. 23 is a view exemplifying a window displayed in graph display processing. In FIG. 23, a graph upon selecting the resistance (guide resistance) is displayed.

According to the embodiment, the user can easily set even the attachment conditions and lengths of various elastic sheets. Even when an elastic sheet and another building component interfere with each other, the user can start a simulation without a complicated operation. Also when performing a simulation while changing the conditions of a flexible medium such as paper, the user can use previously set elastic sheet conditions without changing them. This can decrease the number of steps which require settings.

When defining an elastic sheet as an elastic member by manipulating the member designation button 4A, the user may designate a member to be handled as an elastic sheet upon loading a sectional shape from a CAD system, analysis pre-and-post processor, or the like. This can reduce the setting load.

When defining an elastic sheet as an elastic member by manipulating the attachment guide designation button 4B, a member to be handled as an elastic sheet need not be contained in members whose sectional shapes output from the CAD system, analysis pre-and-post processor, or the like are loaded. Even if a member to be handled as an elastic sheet does not exist in members displayed in the window, the elastic sheet can be set. The user need not execute correction work using the CAD system, analysis pre-and-post processor, or the like to only add an elastic sheet, reducing the user burden.

When defining an elastic sheet as an elastic member by manipulating the attachment coordinate point/length designation button 4C, neither a member to be handled as an elastic sheet nor a guide member to be attached need be contained in members whose sectional shapes output from the CAD system, analysis pre-and-post processor, or the like are loaded. The user can model a deformed portion by inputting only a length, so information regarding the member to be handled and the guide member to be attached is not required. Thus, the load of setting a deformed portion can be reduced.

When defining an elastic sheet as an elastic member by manipulating the attachment coordinate point/distal end coordinate point designation button 4D, neither a member to be handled as an elastic sheet nor a guide member to be attached need be contained in members whose sectional shapes output from the CAD system, analysis pre-and-post processor, or the like are loaded. Further, the degree of freedom of the elastic sheet shape can be increased.

Note that the embodiment of the present invention can be implemented by, for example, executing a program by a computer. A means for supplying the program to the computer, for example, a computer-readable recording medium such as a CD-ROM which records the program, or a transmission medium such as the Internet for transmitting the program is also applicable as an embodiment of the invention. The foregoing print processing program is also applicable as an embodiment of the invention. The program, recording medium, transmission medium, and program product fall within the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-100677, filed Apr. 8, 2008, which is hereby incorporated by reference herein in its entirety.

The invention claimed is:

1. An analysis apparatus comprising:
   a specifying unit configured to specify a deformable portion and indeformable portion of an elastic sheet in a conveyance path through which a flexible medium moves;
   a rotational movement unit configured to rotate and move the deformable portion by using a boundary between the deformable portion and the indeformable portion as a fulcrum so that the deformable portion does not cross a member in the conveyance path;
   a setting unit configured to set a rigidity of the elastic sheet;
   a definition unit configured to define the elastic sheet as an elastic member; and
   a calculation unit configured to calculate a behavior of the flexible medium when the flexible medium moves through the conveyance path, in consideration of a restoring force of the elastic member to restore a linear shape.

2. The analysis apparatus according to claim 1, wherein said specifying unit includes
   a display unit configured to display at least two members in the conveyance path, and
   a determination unit configured to, when one of said at least two members is designated as the elastic sheet, determine, as the indeformable portion, a portion of the designated member that contacts another member with a length, and determine a remaining portion as the deformable portion.

3. The analysis apparatus according to claim 1, wherein said specifying unit includes
   a display unit configured to display a member in the conveyance path, and
   a creation unit configured to, when part of a line segment which forms the member is designated as a portion to which the elastic sheet is attached, and a value representing a length of the deformable portion is designated, set the designated portion as the indeformable portion, and create the deformable portion having the length represented by the designated value on a line extended from the indeformable portion on a predetermined side out of two ends of the indeformable portion.

4. The analysis apparatus according to claim 1, wherein said specifying unit includes creation unit configured to, when a position of the indeformable portion is designated and a value representing a length of the deformable portion is designated, create the indeformable portion based on the designated position, and create the deformable portion having the length represented by the designated value on a line extended from the indeformable portion on a predetermined side out of two ends of the indeformable portion.

5. The analysis apparatus according to claim 1, wherein said specifying unit includes creation unit configured to, when a first position of the indeformable portion is designated and a second position of an end of the deformable portion on a side on which the deformable portion is spaced apart from the indeformable portion is designated, create the indeformable portion based on the first position, and create the deformable portion on a line segment which connects a predetermined side out of two ends of the indeformable portion, and the second position.

6. A computer analysis method comprising:
   a specifying step using a computer processor to specify a deformable portion and indeformable portion of an elastic sheet in a conveyance path through which a flexible medium moves;
   a rotational movement step using a computer processor to rotate and move the deformable portion by using a boundary between the deformable portion and the indeformable portion as a fulcrum so that the deformable portion does not cross a member in the conveyance path;
   a setting step using a computer processor to set a rigidity of the elastic sheet;
   a definition step using a computer processor to define the elastic sheet as an elastic member; and
   a calculation step using a computer processor to calculate a behavior of the flexible medium when the flexible medium moves through the conveyance path, in consideration of a restoring force of the elastic member to restore a linear shape.

7. A non-transitory computer-readable storage medium storing a program causing a computer to execute
   a specifying step of specifying a deformable portion and indeformable portion of an elastic sheet in a conveyance path through which a flexible medium moves,
   a rotational movement step of rotating and moving the deformable portion by using a boundary between the deformable portion and the indeformable portion as a fulcrum so that the deformable portion does not cross a member in the conveyance path,
   a setting step of setting a rigidity of the elastic sheet,
   a definition step of defining the elastic sheet as an elastic member, and
a calculation step of calculating a behavior of the flexible medium when the flexible medium moves through the conveyance path, in consideration of a restoring force of the elastic member to restore a linear shape.

* * * * *